(12) United States Patent
Vostrikov et al.

(10) Patent No.: US 10,474,743 B2
(45) Date of Patent: Nov. 12, 2019

(54) METHOD FOR PRESENTING NOTIFICATIONS WHEN ANNOTATIONS ARE RECEIVED FROM A REMOTE DEVICE

(71) Applicant: CANON KABUSHIKI KAISHA, Tokyo (JP)

(72) Inventors: Evgeny Vostrikov, Macquarie Park (AU); Ij Eric Wang, Denistone (AU)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 15/254,946

(22) Filed: Sep. 1, 2016

(65) Prior Publication Data

US 2017/0068650 A1    Mar. 9, 2017

(30) Foreign Application Priority Data

Sep. 8, 2015 (AU) ................................. 2015224398

(51) Int. Cl.
*G06F 17/24* (2006.01)
*G11B 27/34* (2006.01)

(52) U.S. Cl.
CPC ............ *G06F 17/241* (2013.01); *G11B 27/34* (2013.01)

(58) Field of Classification Search
CPC .... G06F 17/241; G06K 9/00718; G11B 27/34
See application file for complete search history.

(56) References Cited

U.S. PATENT DOCUMENTS

| | | | |
|---|---|---|---|
| 6,332,144 B1 | 12/2001 | deVries | |
| 8,131,866 B2 | 3/2012 | Samra | |
| 8,744,979 B2 | 6/2014 | Sundelin | |
| 8,775,922 B2 | 7/2014 | Datar | |
| 2008/0010601 A1* | 1/2008 | Dachs | G06Q 10/10 715/751 |
| 2009/0317062 A1* | 12/2009 | Jung | H04N 5/85 386/353 |
| 2013/0325970 A1 | 12/2013 | Roberts | |
| 2014/0344359 A1* | 11/2014 | Broz | H04L 67/10 709/204 |

FOREIGN PATENT DOCUMENTS

WO    2014/100780 A1    6/2014

* cited by examiner

*Primary Examiner* — Howard Cortes
(74) *Attorney, Agent, or Firm* — Canon U.S.A., Inc. IP Division

(57) ABSTRACT

A method for selecting a display characteristic for a video annotation notification on a destination display device interconnected across a communications network to at least one source device that generates a video annotation includes receiving, determining, and selecting. An annotated video content is received from the at least one source device, wherein the annotated video content is associated with a source position in a video production hierarchy. A destination position is determined in the video production hierarchy for video content displayed on the destination display device. A correspondence is determined between the determined destination position and the source position associated with the annotated video content to define a relevance value. A content complexity value is determined based on the annotated video content. For the destination display device, one or more display characteristics of the video annotation notification is selected based on the relevance value and the determined content complexity value.

18 Claims, 20 Drawing Sheets

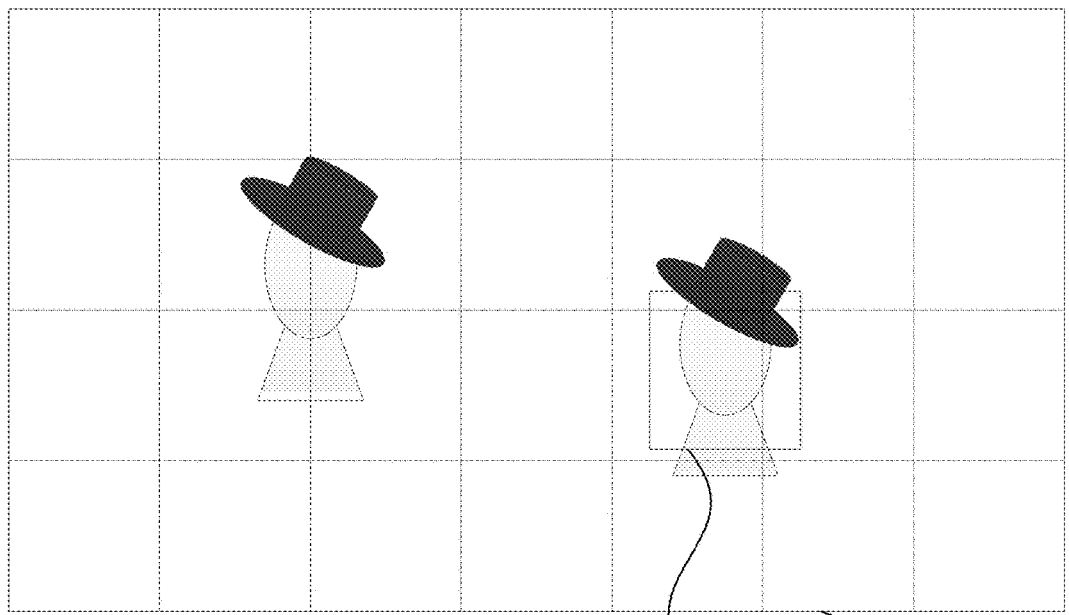
Fig. 14A(1)   1454   1452
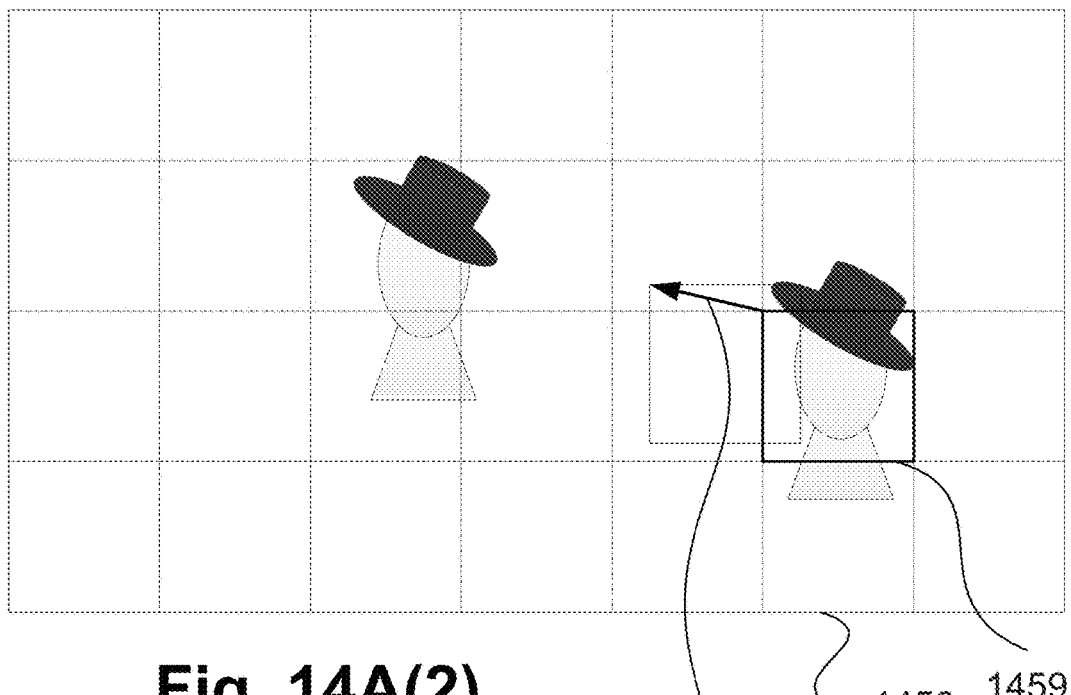
Fig. 14A(2)   1458   1456   1459

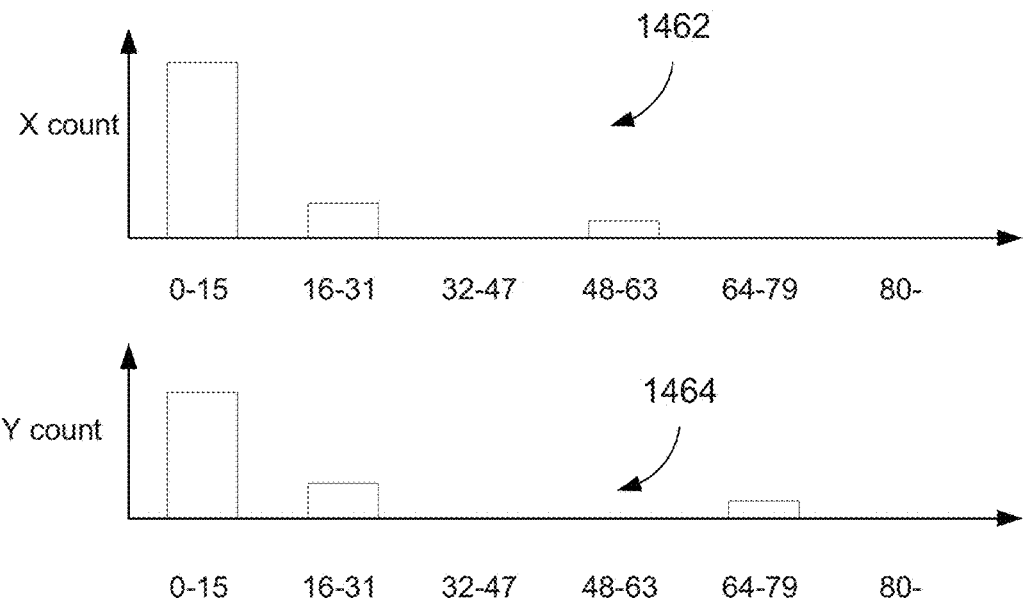
Fig. 14B(1)
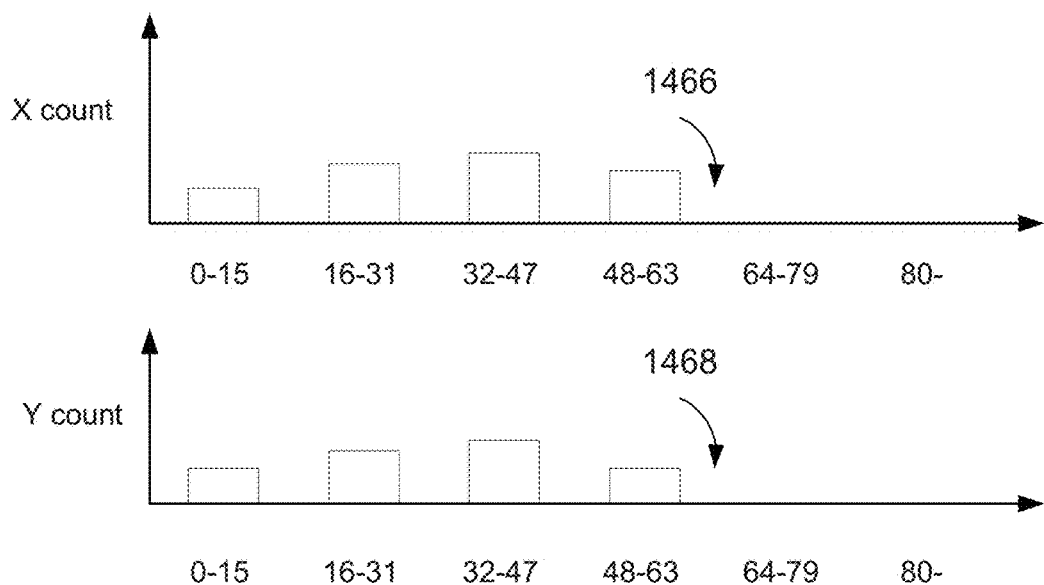
Fig. 14B(2)

METHOD FOR PRESENTING NOTIFICATIONS WHEN ANNOTATIONS ARE RECEIVED FROM A REMOTE DEVICE

REFERENCE TO RELATED APPLICATIONS

This application claims the benefit under 35 U.S.C. § 119 of the filing date of Australian Patent Application No. 2015224398, filed Sep. 8, 2015, hereby incorporated by reference in its entirety as if fully set forth herein.

TECHNICAL FIELD

The present invention relates to cinematography and digital cinema. In particular, the present invention relates to a method apparatus and system for applying an annotation to a portion of a video sequence, and then distributing the annotation to remote devices across a communications network.

BACKGROUND

The advent of digital imaging technology has altered the behaviour of the film industry, in the sense that more and more movies are produced digitally. Digital cinematography, the process of capturing video content as digital content items, has become increasingly prevalent for film production.

In addition to simplifying the transition of source materials between production and post-production, digital cinematography has improved the work flow of production. For example, digital cinematography has enabled on-set monitoring, which means directors, clients, and others on set are able to watch the live videos of every shot during film production via a communications network, such an on-set Wi-Fi network. The use of on-set monitoring devices connected to the network has opened possibilities for real-time collaboration between people involved in the video production process.

While live review can provide useful information to the director, it is often desired that this information is annotated for further usage, and annotations are passed on to others on set.

Annotation exchange between devices is a useful collaboration tool during a video production process. However, annotation notifications can be disruptive to the recipient of annotations if a received annotation is irrelevant to the task the recipient is currently performing.

A known approach to limit annotation notifications is to manually apply a set of filters in a settings menu on the user interface. For example, the Director of Photography (DOP) can opt-in to receive only annotation destined for the "DOP" role. A disadvantage of this approach is that annotations have to be explicitly marked for DOP.

Another known approach is that the user can choose to receive only certain types of annotations (e.g. text, audio, graphics). The user may also choose to disable notification alerts for received annotations, or to only receive annotations that are of high priority.

Each of the above approaches have a significant disadvantage in that some annotations, which are potentially relevant to the recipient, can be filtered out because of the manually defined user preferences.

Thus, it is desirable to provide arrangements to improve upon one or more shortcomings of known approaches.

SUMMARY

Annotation exchange during a video production process is a useful collaboration tool. Normally, an annotation has an associated context, usually the context is a video clip. Each video clip has assigned a corresponding slate number, and hence annotations created also have an associated slate number.

When the annotation is created on one device and broadcast to one or more other devices, a recipient of the annotation operating one of the other devices may be in a different context (e.g. reviewing a different video clip) and the received annotation may not be relevant to that recipient. However, there could be a case where, despite the differences in contexts, an annotation is still relevant, and it makes sense to present it to the recipient. For example, the video clips under review by the recipient may be a different re-take of the same action, but with a slight variation.

Presently described is a method of selectively generating an annotation notification alert on the recipient's device, where the decision on whether and how to generate the annotation notification alert is based on:

(i) a difference between the slate number associated with the annotation and the slate number of the video currently being reviewed on the recipient's device, and (ii) a content complexity of the video to which the annotation is applied (the "annotated video").

According to one aspect of the present disclosure, there is provided a method for selecting one or more display characteristics of a video annotation notification on at least one destination display device interconnected across a communications network to a source device for generating the video annotation, comprising:

annotating video content using the source device for communication to the at least one destination display device, said annotated video content being associated with a source position in a video production hierarchy;

determining a destination position in the video production hierarchy for video content displayed on the at least one destination display device;

determining a correspondence between the determined destination position and the source position associated with the annotated video content to define a relevance value;

determining a content complexity value based on the annotated video content; and selecting, for the at least one destination display device, one or more display characteristics of a notification of the video annotation based on the relevance value and the determined content complexity value.

According to another aspect of the present disclosure, there is provided a method for selecting a display characteristic for a video annotation notification on a destination display device interconnected across a communications network to at least one source device that generates a video annotation, comprising:

receiving annotated video content from the source device, said annotated video content being associated with a source position in a video production hierarchy;

determining a destination position in the video production hierarchy for video content displayed on the destination display device;

determining a correspondence between the determined destination position and the source position associated with the annotated video content to define a relevance value;

determining a content complexity value based on the annotated video content; and selecting, for the destination display device, one or more display characteristics of the notification of the video annotation based on the relevance value and the determined content complexity value.

The methods may further comprise displaying the video annotation notification at the destination display device according to a selected one of the display characteristics.

Desirably at least one of the display characteristics suppresses display of the video annotation notification on the destination display device.

Further, where the determined destination position and the source position are the same, the relevance value is maximized, and where the determined destination position and the source position are not the same, the relevance value is not a maximum. Preferably, the video production hierarchy includes multiple hierarchal components and the relevance value is determined based on a matching of the destination position and source position across the multiple hierarchical components. Advantageously the multiple hierarchical components include at least two of scene, shot and take.

In a preferred arrangement the determination of the content complexity value comprises consideration of shot characteristics associated with the annotated video content, the shot characteristics including at least one of shot type and shot dynamism.

In another arrangement the context complexity is determined from multiple sources associated with the annotated video content, the multiple sources including at least one of user input data and analysis of video content. Desirably the analysis of video content includes at least one of motion estimation and feature detection.

In one implementation the content complexity is determined from a set of shot characteristics representing a distance between components in the video production hierarchy.

In another, the selected at least one display characteristic includes one of a dialog message box and highlighting of an annotation in an annotation list.

The selected at least one display characteristic may comprises displaying the video annotation at the destination display device.

According to another aspect of the present disclosure, there is provided a method for selecting a display characteristic for a video annotation notification on a destination display device interconnected across a communications network to at least one source device that generates a video annotation, comprising:

receiving annotated video content from the source device, said annotated video content being associated with a source position in a video production hierarchy;

determining a destination position in the video production hierarchy for video content displayed on the destination display device;

determining a correspondence between the determined destination position and the source position associated with the annotated video content; and selecting, for the destination display device, one or more display characteristics of the notification of the video annotation based on the determined correspondence.

According to another aspect of the present disclosure, there is provided a method for selecting a display characteristic for a video annotation on a destination display device interconnected across a communications network to at least one source device that generates a video annotation, comprising:

receiving annotated video content from the source device, said annotated video content being associated with a source position in a video production hierarchy;

determining a destination position in the video production hierarchy for video content displayed on the destination display device;

determining a correspondence between the determined destination position and the source position associated with the annotated video content to define a relevance value;

determining a content complexity value based on the annotated video content; and selecting, for the destination display device, a display characteristic for the video annotation based on the relevance value and the determined content complexity value.

Desirably the selected display characteristic is one of:
(i) a display of the video annotation;
(ii) a display of the notification of the video annotation; and
(iii) a suppression of display of each of the video annotation and the notification of the video annotation.

Also provided is a non-transitory computer readable storage medium having a program recorded thereon, the program being executable by a processor to select a display characteristic associated with a video annotation according to a method as described.

Also disclosed is an interactive display device having a processor coupled to a memory, the memory having stored thereon a program executable by the processor to perform a method as described.

In specific implementations, the slate number is a hierarchical identifier, where each level in the hierarchy relates to a component of the production process. For example, a slate number of 1.2.7 may refer to Scene #1, Shot #2, Take #7. When an annotation is received, the slate number of the annotation is compared with the slate number of the video being reviewed on the recipient's device. Then, depending on a level of difference between the slate components, a threshold is chosen for annotation suppression. See the following example table:

| Difference in slate components | Threshold for annotation notification suppression |
| --- | --- |
| All components different | 0 (Min) |
| Same Scene component Different Shot and Take components | 20 (Low) |
| Same Scene and Shot components Different Take component | 80 (High) |
| All components equal | 100 (Max) |

EXAMPLES (a) If SA:1.1.1 and SR:1.1.1, the threshold will be Max
(b) If SA:1.1.1 and SR:1.1.2, the threshold will be High
(c) If SA:1.1.1 and SR:1.2,1 the threshold will be Low
(d) If SA:1.1.1 and SR:2.1.1, the threshold will be Min
where
(i) SA:x.x.x is the slate number of the annotation, and
(ii) SR:x.x.x is the slate number of currently viewing video on the recipient's device.

As will be appreciated from the above, according to the present arrangements, a received annotation need not be displayed by the secondary display device 220. Specifically, subject to selection of the relevant display characteristics, the annotation in some instances may be suppressed from display. Alternatively, where certain display characteristics are satisfied, display of the annotation is enabled. In others, the notification of the annotation may be suppressed.

The content complexity is desirably represented as a content complexity coefficient which is derived from shot characteristics of the annotated video. Shot characteristics are metrics that describe the video content. Examples of shot characteristics include, but are not limited to:

(i) "Shot type"—close up (i.e. narrow angle) or wide angle;

(ii) "Shot dynamism"—static (i.e. camera is stationary, one person talking to the camera) or moving (camera is moving, a lot of action happens on the screen).

Shot characteristics can also be computed automatically: for example:

(i) from lens angle, (ii) from object detection, and/or (iii) from motion estimation.

For each shot characteristic a complexity coefficient is computed. For example

| Shot characteristics | | | |
|---|---|---|---|
| Shot type (k1) | Close up 0 | <=> | Wide angle 50 |
| Dynamism (k2) | Static 0 | <=> | Moving 90 |

Then the overall video content complexity coefficient is computed as $$K=\text{MAX}(k1,k2)$$

Once the content complexity coefficient is computed, it is compared with the threshold. If the coefficient is lower than the threshold, then the notification alert is generated, otherwise not. Other aspects are also disclosed.

According to another aspect of the present disclosure, there is provided a non-transitory computer readable storage medium having a program recorded thereon, the program being executable by a processor to select one or more display characteristics of a video annotation notification on at least one destination display device interconnected across a communications network to a source device for generating the video annotation, the program comprising:

code for receiving annotated video content from the source device, said annotated video content being associated with a source position in a video production hierarchy;

code for determining a destination position in the video production hierarchy for video content displayed on the at least one destination display device;

code for determining a correspondence between the determined destination position and the source position associated with the annotated video content to define a relevance value;

code for determining a content complexity value based on the annotated video content; and code for selecting, for the at least one destination display device, one or more display characteristics of a notification of the video annotation based on the relevance value and the determined content complexity value.

According to another aspect of the present disclosure, there is provided an apparatus for selecting one or more display characteristics of a video annotation notification on at least one destination display device interconnected across a communications network to a source device for generating the video annotation, the apparatus comprising:

means for receiving annotated video content from the source device, said annotated video content being associated with a source position in a video production hierarchy;

means for determining a destination position in the video production hierarchy for video content displayed on the at least one destination display device;

means for determining a correspondence between the determined destination position and the source position associated with the annotated video content to define a relevance value;

means for determining a content complexity value based on the annotated video content; and means for selecting, for the at least one destination display device, one or more display characteristics of a notification of the video annotation based on the relevance value and the determined content complexity value.

According to another aspect of the present disclosure, there is provided an electronic device having a processor coupled to a memory, the memory having stored thereon a program executable by the processor to:

receive annotated video content from a source device, said annotated video content being associated with a source position in a video production hierarchy;

determine a destination position in the video production hierarchy for video content displayed on the at least one destination display device;

determine a correspondence between the determined destination position and the source position associated with the annotated video content to define a relevance value;

determine a content complexity value based on the annotated video content; and select, for the at least one destination display device, one or more display characteristics of a notification of the video annotation based on the relevance value and the determined content complexity value.

BRIEF DESCRIPTION OF THE DRAWINGS

At least one embodiment of the present invention will now be described with reference to the following drawings, in which:

FIGS. 14A(1) and 14A(2) illustrate reference and current frames respectively for block-based motion compensation;

FIGS. 14B(1) and 14B(2) show histograms derived from motion vectors for frames with little and higher motion respectively;

DETAILED DESCRIPTION INCLUDING BEST MODE

Narrative films, which are probably the most widely screened films in theatres, are one type of film product that tells a story. The goal of narrative film making is to compose a sequence of events in audio and/or visual form based on a written (fictional or fictionalized) story. With the advent of digital imaging technology, digital cinematography, being high-quality acquisition of video data using digital cinema cameras during film production, has become increasingly widespread for narrative film making. Similarly, digital cinematography is finding increasing application in other types of films, such as documentary films, examples of which include those based on pre-historic Earth and astronomical science.

Figure 1:
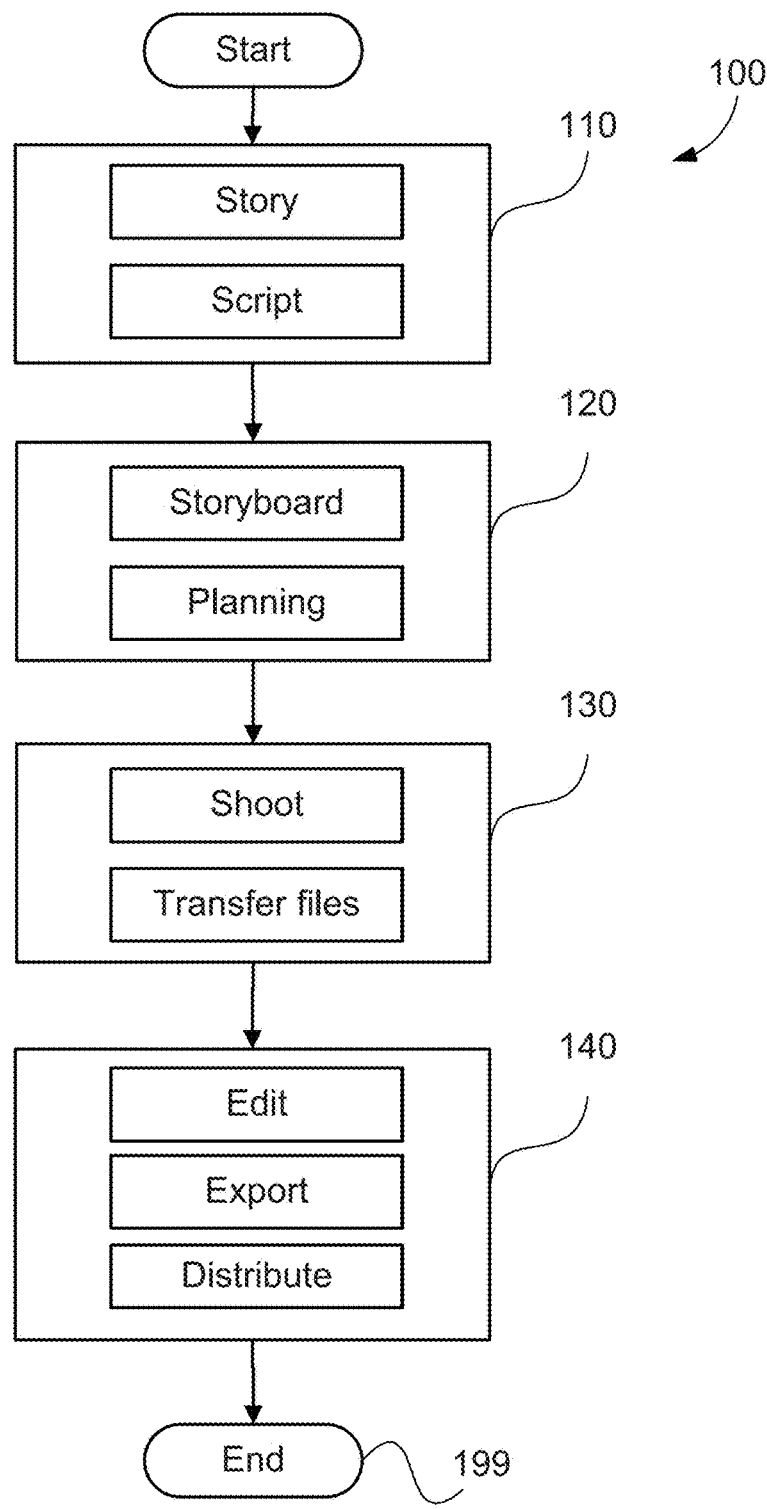
FIG. 1 is a schematic representation of a traditional workflow used for video and film production.

FIG. 1 shows a method 100 representative of a workflow used in digital cinematography for narrative and other types of film making. The method 100 mainly comprises the following stages: a development stage 110, a pre-production stage 120, a production stage 130, and a post-production stage 140. The stages 110 to 140 are typically executed in sequence to produce a final film.

At the development stage 110, a film producer selects a story and develops a script with the help of a screenwriter. During the development stage 110, key elements such as financing, principal cast members, directors, and cinematographers for the film are confirmed.

Following the development stage 110 is the pre-production stage 120. At the pre-production stage 120, storyboards, which are visual images helping communicating ideas for the script, are developed. Furthermore, during the pre-production stage 120, each step of actually making the film is designed and planned.

Following the pre-production stage 120 is the production stage 130. At the production stage 130, raw footage for the film is generated. In particular, shots, which are short recorded video sequences, are captured or recorded for different scenes of the film. Shots are recorded using an image capture apparatus, such as a digital video camera. A shot is a basic unit of the production stage 130 corresponding to a continuous recording of a scene of the film from the time the image capture apparatus starts recording until the time the imaging apparatus stops recording. It is common to capture multiple alternative versions for any given shot at the production stage 130. Each alternative shot captured is referred to as a take. Acquiring multiple takes for a given shot helps ensure there is footage of sufficient quality for use in the post-production stage 140. Each take that is captured is stored with associated metadata relating to the captured video sequence.

In a typical feature film production process, the film crew uses a clapperboard device. The clapperboard device has two primary applications—it assists in synchronising of picture and sound, and contains information about the shot being recorded. The information about the shot being recorded typically conveys (a) production specific information such as date and time, production title, name of the director, name of director of photography (DOP), and (b) shot specific information such as scene, shot, take, timecode. The clapperboard can be either physical device, or its representation on the screen of a portable device. The clapperboard is also variously referred to as slate, slate board, clapper, clapboard, slapperboard, sync slate, time slate, sticks, board, or sound marker.

The information on the clapperboard is typically used for managing video assets during the production process. The information on the clapperboard that identifies scene information (i.e. scene, shot, take) is widely referred as the slate number. The slate number usually follows two popular slating systems: American and European.

In the American system, the slate number records the following fields: scene number, camera angle and take number; e.g. scene 24, C, take 3. Scene designation is usually a combination of a number and a letter: the number correlates to the scene being shot, and the letter correlates to the current shot.

In the European system the slate number records the following fields: slate number, and take number, e.g. slate 256, take 3C. The scene number may also be included. If the scene number is not included, then a separate continuity sheet document is used, which maps the slate number to the scene number.

Other slating systems may also be used.

Regardless of which slating system is used, usually scene, shot and take information can be derived from the slate number. Further it will be appreciated that slate numbers can be converted between different systems and nomenclatures. The slating system notation that is used in this patent description is in the A.B.C form, where A corresponds to Scene, B corresponds to Shot, C corresponds to Take. For example, 1.4.5 means Scene 1, Shot 4, Take 5.

The main characteristic of the abovementioned slate numbering systems is that the slate number is typically a unique identifier which allows conceptual grouping of video assets by some common meaning. For example, a set of takes can be grouped to represent multiple recordings of the same shot. The scene number groups shots into a sequence of conceptually related events of the film story line.

Hence it is common that each video asset captured during production stage 130 is stored with an associated slate number.

The slate number is commonly used in management of video assets captured during video production, and allows unique identification of the position of the video assets in the video production hierarchy.

Furthermore, the slate number is useful in identifying replicas of a take. Multiple replicas of a take may be created during a recording process. It is typical to record a take simultaneously into a full-resolution raw video file and into transcoded lower resolution video files. The low resolution files are widely referred to as "proxy" video files. "Proxy" video files usually record the same video, audio and timecode as their full-resolution counterparts, thus "proxy" files are commonly used as a temporary substitute of the full-resolution files. A high-definition video asset and its "proxy" replicas are typically assigned the same slate number.

Following the production stage 130 is the post-production stage 140. At the post-production stage 140, the captured shots are edited and then exported to various formats such as Digital Versatile Disc (DVD), Blue-ray Disc™ (BD), Holographic Versatile Disc (HVD), etc. for distribution. The editing process of the post-production stage 140 consists of reviewing the content and assembling the film. Metadata created in the production stage 130 is utilized for editing at the post-production stage 140. For example, colour grading may be utilized to enhance or alter the colour of the acquired shots, in light of a cinematographer's or director's notes on colours.

Variations of the method 100 of FIG. 1 are possible in practice. However, film making typically employs pre-production (planning), production (capture) and post-production (editing) stages in some form.

The described method 100 of FIG. 1 or its variations are also applicable in some forms to other types of video production, such as wedding videography, corporate video production, promotional advertising video production, etc.

In some types of video productions, the slate numbering systems may not be used as a main means for managing video assets. Alternative systems of asset organisation may be used. For example, in some systems video assets may be grouped by place and time, by event types etc. For example, in a wedding video production the video assets may be grouped by place category such as "Reception", "Church" etc. The video assets that are placed into one of the categories, can furthermore be grouped by events. For example, video assets in the "Church" group can be grouped by event types such as "The bride walks down the aisle", "The vows", "Lighting the unity candle", etc.

Regardless of which system is used to manage video assets, the main characteristic of such systems is to identify a position of a video resource in a video production hierarchy.

During the production stage 130, directors of the film review the captured takes and record notes in report sheets. The notes may include possible issues or general comments on the takes. In digital cinematography, reviewing the acquired takes may be supported by on-set monitoring, enabled by wireless encoders and mobile devices. One example is wireless on-set monitoring to a tablet device, such as an iPad™ (Apple Inc. of California), using wireless video transmitter, such as a Teradek Cube™ (Teradek, LLC, of California). The Teradek Cube™ and the iPad™ can connect to the same communications network, e.g. a Wi-Fi (IEEE 802.11) network, and communicate via the communication network. Once the Teradek Cube™ has been connected to the image capture apparatus via a connection such as a HDMI/HD-SDI connection, the Teradek Cube™ transmits live video (live capture of takes) from the image capture apparatus to the iPad™ with little appreciable delay. This arrangement allows effective live (real-time) monitoring of the take on the iPad™.

Annotations that the directors of the film have interest can be classified into a number of categories. Typical categories of annotations may comprise performance, camera (image capture apparatus) parameters, and quality. The performance category includes annotations relating to characters of the film. Example annotation types include script, voice, and character positioning. Camera parameter annotations typically include annotation types such as framing and zoom speed. Framing refers to selection of what to include in the image captured using the camera. Expressive qualities of framing include an angle of the camera to an object of the image, an aspect ratio of the projected image, and the like. Zooming means a change of focus length of a lens of the camera while the shot is in progress. Different effects may be created by different zooming speed. For example, zooming in creates a feeling of seemingly "approaching" a subject of the shot while zooming out makes audience feel that they are seemingly "distancing" the subject. Quality annotation types relate to issues of quality of the video sequence captured by the camera such as blur and focus. Different quality requirements may affect the camera movements. For example, a smooth camera pan may allow the image to be sharp enough for the audience to observe, whereas a fast pan may create motion blur to the image. Such information may be used in adjusting camera movement when making the next shot. The abovementioned annotations may provide some guidance at the production stage 130 as to how to improve shooting the next shot, or at the post-production stage 140 to improve editing.

When an annotation is created by the director, it is often desired that this information is also shared with others on set, including teams performing post-production work, or other stakeholders interested in the process. A system for annotating video and sharing annotations is widely called a "collaborative annotation system".

In the pre-production stage 130, a type of the production will be specified. Production types include, for example wedding, drama, TV commercial, and company training and the like. Different production types may require different annotations. For example, for shooting wedding videos, special annotations may be required for marking special moments such as cake cutting, and the exchange of rings. Similarly, TV commercial productions may require designated annotations on marking continuity of an associated story flow. Given the large variety of annotations that a director may wish to record, it would be advantageous to provide a means for capturing different annotations to prevent loss of information between the production stage 130 and the post-production stage 140. It would be useful to have a streamlined means for recording annotations on a live stream of video while a shot is being captured.

It is useful to implement a touch-to-annotate operation in the production stage as touch-to-annotate is convenient to the user (e.g. director) for reviewing and editing video sequence. A range of single and multi-touch gestures are known and widely supported by mobile touch screen based devices, like the iPad™, and include such things as a tap, double tap, a pinch, a two finger rotate, stroking out a line, multi-finger swipe, etc.

Annotation exchange between devices is a useful collaboration tool during a video production and video post-production process. However, annotation notifications can be disruptive to the recipient of annotations where the received annotation is irrelevant to a task the recipient of annotation is currently doing. It is therefore desirable to have a method to determine the intelligent way of generating annotation notifications.

A need exists to facilitate a collaborative annotation process during digital film production. The arrangements described determine notification display characteristics of annotation notifications by determining (i) content complexity value of video and (ii) relevance value of the annotation.

Figure 2:
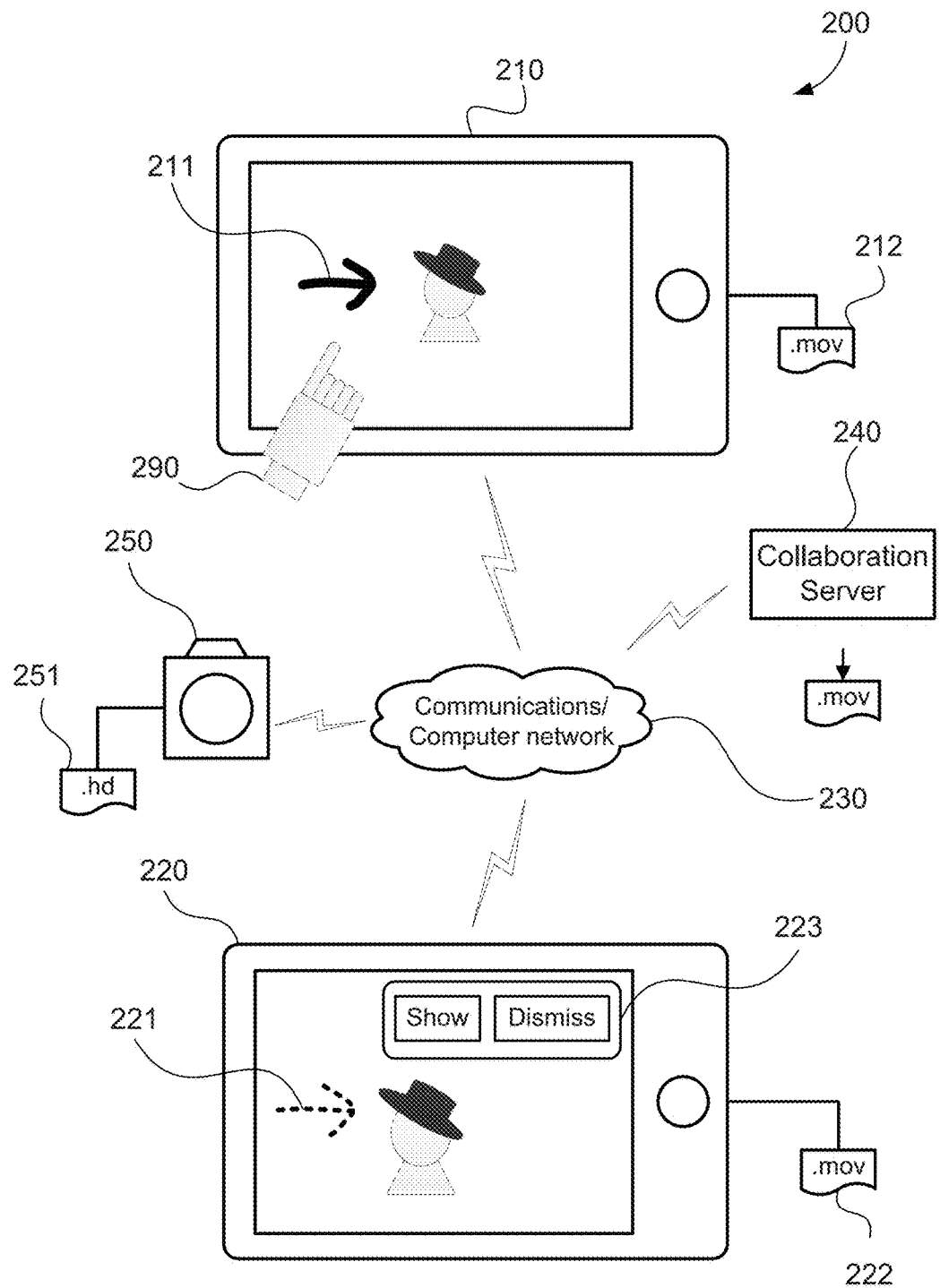
FIG. 2 is a schematic representation of an architecture within which video capture and annotation may be performed in accordance with the present disclosure.

In a preferred arrangement, a collaborative annotation system 200 as presented on FIG. 2 is used. The system 200 comprises a video camera 250 and at least two interactive display devices 210 and 220 (e.g. tablet devices) interconnected by means of a communications network 230, in this case illustrated as a wireless network. In an alternative arrangement, the collaborative annotation system 200 additionally includes a collaboration server 240, where the collaboration server 240 is connected to the same communications network 230. In view of the networked connectivity of the system 200, in some implementations each of the tablet devices 210, 200 may be relatively proximate to the camera 250, for example on the film set and interconnected via a local wireless network, whereas in other implementations one or both of the tablet devices 210,220 may be remote from the camera 250, for example in a work area distanced from the film set and interconnected by a wide area network.

The video camera 250 is capable of streaming live video to the communications network 230. In an alternative arrangement, the video camera 250 may not be capable of streaming video to the communication network 230. In such a case, a separate device can be used that is able to capture the video output from the video camera 250 and stream the video sequence over the communication network 230. One example of such a device is the abovementioned Teradek Cube™. The video camera 250 may also provide an Application Peripheral Interface (API), through which one or more client devices can control the video camera 250 and request the status of the video camera 250. One example of the camera status is a recording status that indicates whether or not the video camera 250 is recording a video sequence.

In the described arrangement, the tablet devices 210 and 220 are configured to operate in at least three modes—(i) live viewing of the video stream transmitted via the communications network 230 from the video camera 250, and (ii) recording the video stream received from the video camera 250 into a "proxy" video file, and (iii) playing back the recorded "proxy" video file. The tablet devices 210 and 220 are connected to the same communications network 230 and are able to communicate and exchange arbitrary data between each other.

Figure 18A:
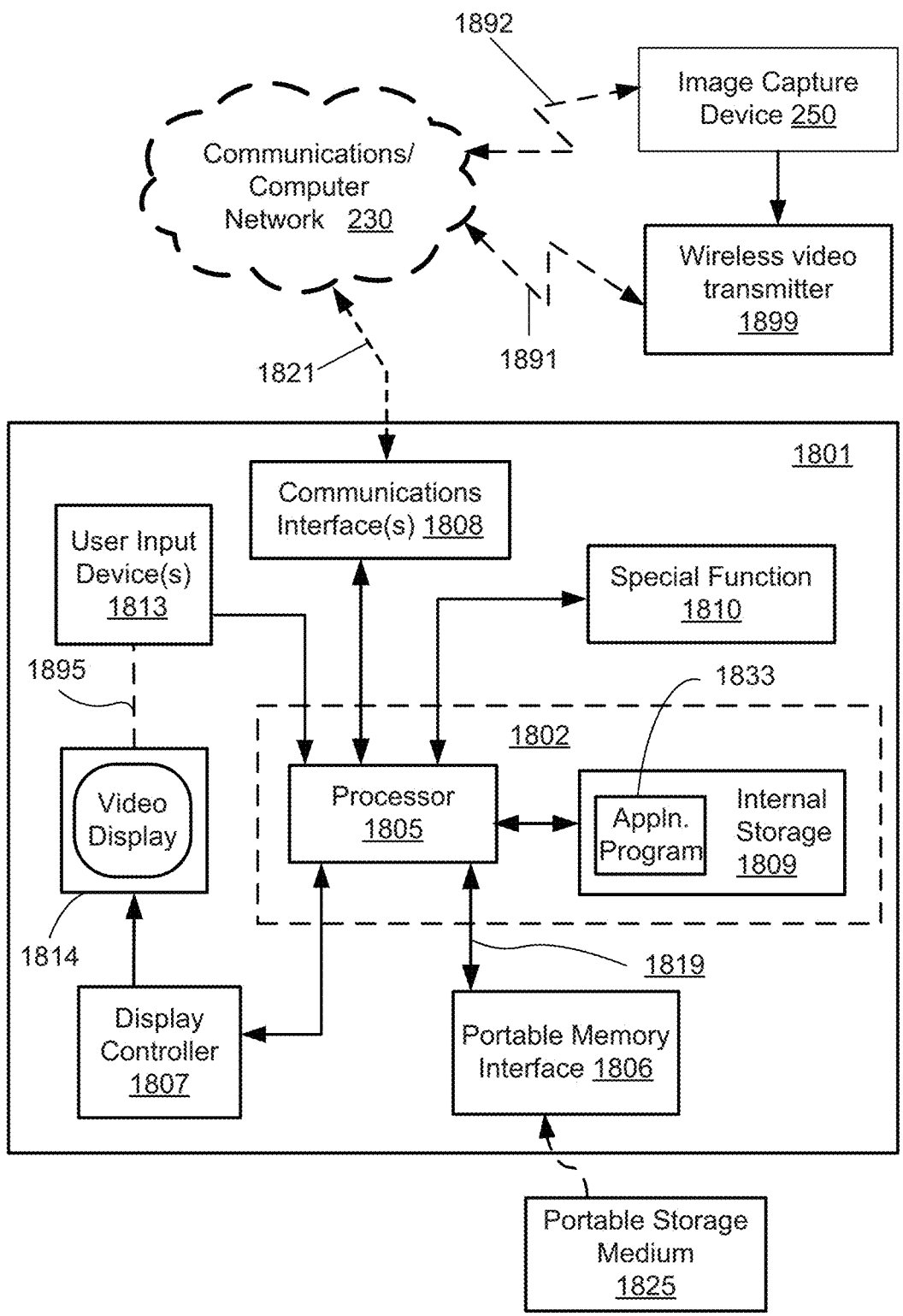
FIGS. 18A and 18B collectively form a schematic block diagram representation of an electronic device upon which described arrangements can be practised.
Figure 18B:
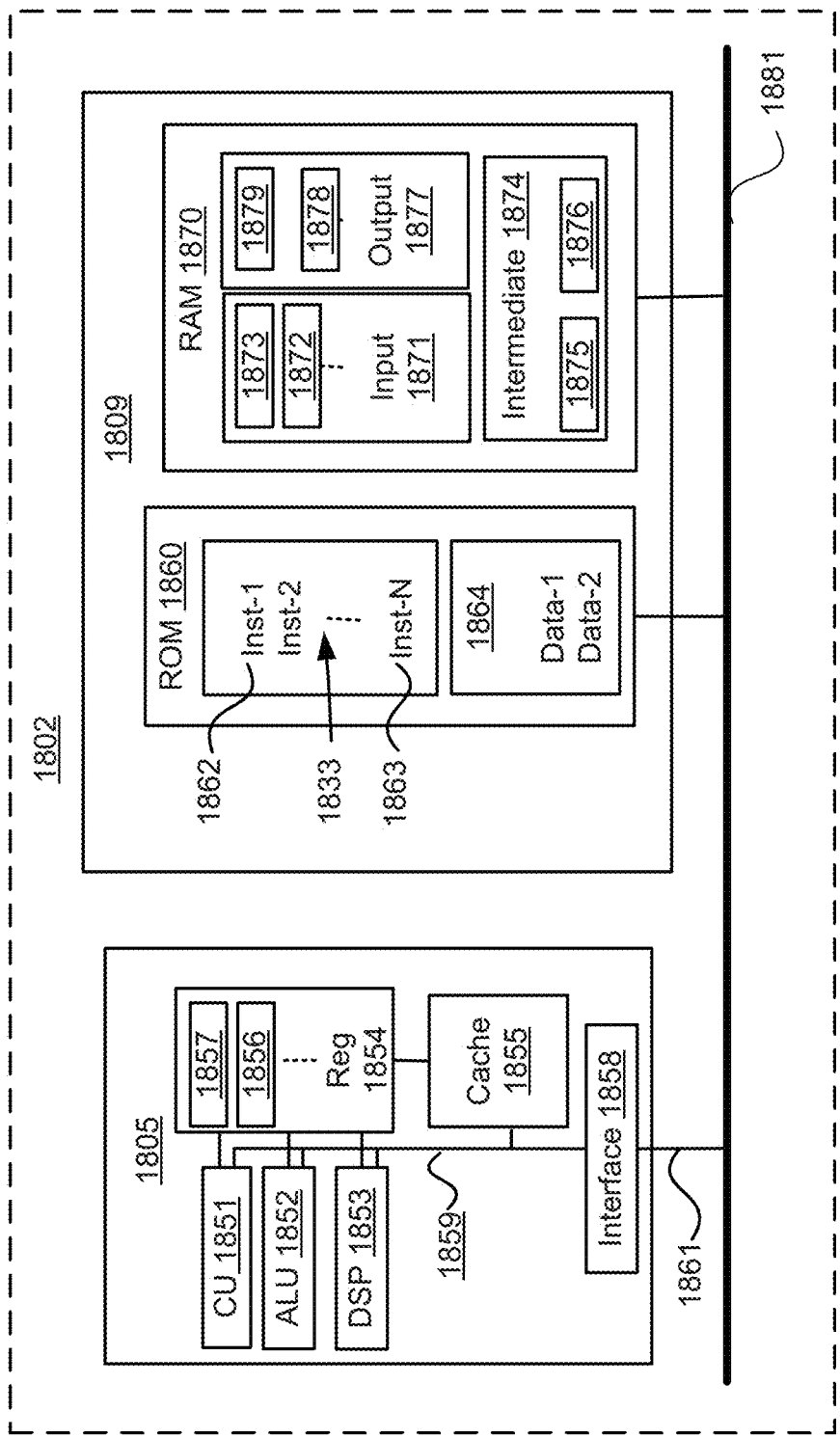

The methods described are typically implemented using at least one portable electronic device, such as a tablet device, a smartphone, or the like, having a display suited to real-time video reproduction. FIGS. 18A and 18B collectively form a schematic block diagram of a general purpose electronic device 1801 including embedded components, upon which the methods of annotating a portion of a video stream, to be described, are desirably practiced. In a preferred implementation the electronic device 1801 is a portable tablet device having a touch-screen display akin to the tablet devices 210 and 220 of FIG. 2. However, in other implementations the electronic device 1801 may be another type of electronic device in which processing resources are generally limited, for example a mobile phone, a portable media player, or a smartphone, or an electronic image capture apparatus such as a camera or video camera. Nevertheless, the methods to be described may also be performed on higher-level devices such as desktop computers, server computers, and other such devices with significantly larger processing resources. Each of these devices, when configured with appropriate application software and graphical user interfaces form what may be generically called and interactive display device.

As seen in FIG. 18A, the device 1801 comprises an embedded controller 1802. Accordingly, the device 1801 may be referred to as an "embedded device." In the present example, the controller 1802 has a processing unit (or processor) 1805 which is bi-directionally coupled to an internal storage module 1809. The storage module 1809 may be formed from non-volatile semiconductor read only memory (ROM) 1860 and semiconductor random access memory (RAM) 1870, as seen in FIG. 18B. The RAM 1870 may be volatile, non-volatile or a combination of volatile and non-volatile memory.

The device 1801 includes a display controller 1807, which is connected to a video display 1814, such as a liquid crystal display (LCD) panel or the like. The display controller 1807 is configured for displaying bitmap and graphical images on the video display 1814 in accordance with instructions received from the embedded controller 1802, to which the display controller 1807 is connected.

The device 1801 also includes user input devices 1813 which are typically formed by keys, a keypad or like controls. In the example described herein, the user input devices 1813 includes a touch sensitive panel physically associated with the display 1814, as depicted by the dashed line 1895, to collectively form a touch screen. For ease of reference, the combination of the display 1814 and the user input devices 1813 are referred to as a touch screen 1814 in the arrangements described, consistent with that type of structure as found in traditional tablet devices, such as the Apple iPad™. The touch screen 1814 may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 18A, the device 1801 also comprises a portable memory interface 1806, which is coupled to the processor 1805 via a connection 1819. The portable memory interface 1806 allows a complementary portable memory device 1825 to be coupled to the tablet device 1801 to act as a source or destination of data or to supplement the internal storage module 1809. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 1801 also has a communications interface 1808 to permit coupling of the device 1801 to a computer or the communications network 230 via a connection 1821. The connection 1821 may be wired or wireless. For example, the connection 1821 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like. In the preferred implementations, the communications interface operates according to Wi-Fi standards.

In some instances, the device 1801 is configured to perform some special function. The embedded controller 1802, possibly in conjunction with further special function components 1810, is provided to perform that special function. For example, where the device 1801 is a digital camera, the components 1810 may represent a lens, focus control and image sensor of the camera. The special function components 1810 is connected to the embedded controller 1802. As another example, the device 1801 may be a mobile telephone handset. In this instance, the components 1810 may represent those components required for communications in a cellular telephone environment. Where the device 1801 is a portable device, the special function components 1810 may represent a number of encoders and decoders of a type including Joint Photographic Experts Group (JPEG), (Moving Picture Experts Group) MPEG, MPEG-1 Audio Layer 3 (MP3), and the like. The special function components 1810 may also relate to operation of the touch screen 1814.

The methods described hereinafter may be implemented using the embedded controller 1802, where the processes of FIGS. 2 to 17 may be implemented as one or more software application programs 1833 executable within the embedded controller 1802. The device 1801 of FIG. 18A implements the described methods. In particular, with reference to FIG. 18B, the steps of the described methods are effected by instructions in the software 1833 that are carried out within the controller 1802. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1833 of the embedded controller 1802 is typically stored in the non-volatile ROM 1860 of the internal storage module 1809. The software 1833 stored in the ROM 1860 can be updated when required from a computer readable medium or via communication with a server computer such as a cloud computer. The software 1833 can be loaded into and executed by the processor 1805. In some instances, the processor 1805 may execute software instructions that are located in RAM 1870. Software instructions may be loaded into the RAM 1870 by the processor 1805 initiating a copy of one or more code modules from ROM 1860 into RAM 1870. Alternatively, the software instructions of one or more code modules may be pre-installed in a non-volatile region of RAM 1870 by a manufacturer. After one or more code modules have been located in RAM 1870, the processor 1805 may execute software instructions of the one or more code modules.

The application program 1833 is typically pre-installed and stored in the ROM 1860 by a manufacturer, prior to distribution of the tablet device 1801. However, in some instances, the application programs 1833 may be supplied to the user encoded on one or more CD-ROM (not shown) and read via the portable memory interface 1806 of FIG. 18A prior to storage in the internal storage module 1809 or in the portable memory 1825. In another alternative, the software application program 1833 may be read by the processor 1805 from the network 230, or loaded into the controller 1802 or the portable storage medium 1825 from other computer readable media. Computer readable storage media refers to any non-transitory tangible storage medium that participates in providing instructions and/or data to the controller 1802 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1801. Examples of transitory or non-tangible computer readable transmission media that may also participate in the provision of software, application programs, instructions and/or data to the device 1801 include radio or infrared transmission channels as well as a network connection to another computer or networked device, and the Internet or Intranets including e-mail transmissions and information recorded on Websites and the like. A computer readable storage medium having such software or computer program recorded on it is a computer program product.

The second part of the application programs 1833 and the corresponding code modules mentioned above may be executed to implement one or more graphical user interfaces (GUIs) to be rendered or otherwise represented upon the display 1814 of FIG. 18A. Through manipulation of the user input device 1813 (e.g., the keypad or touch screen), a user of the device 1801 and the application programs 1833 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 18B illustrates in detail the embedded controller 1802 having the processor 1805 for executing the application programs 1833 and the internal storage 1809. The internal storage 1809 comprises read only memory (ROM) 1860 and random access memory (RAM) 1870. The processor 1805 is able to execute the application programs 1833 stored in one or both of the connected memories 1860 and 1870. When the tablet device 1801 is initially powered up, a system program resident in the ROM 1860 is executed. The application program 1833 permanently stored in the ROM 1860 is sometimes referred to as "firmware". Execution of the firmware by the processor 1805 may fulfil various functions, including processor management, memory management, device management, storage management and user interface.

The processor 1805 typically includes a number of functional modules including a control unit (CU) 1851, an arithmetic logic unit (ALU) 1852, a digital signal processor (DSP) 1853 and a local or internal memory comprising a set of registers 1854 which typically contain atomic data elements 1856, 1857, along with internal buffer or cache memory 1855. One or more internal buses 1859 interconnect these functional modules. The processor 1805 typically also has one or more interfaces 1858 for communicating with external devices via system bus 1881, using a connection 1861.

The application program 1833 includes a sequence of instructions 1862 through 1863 that may include conditional branch and loop instructions. The program 1833 may also include data, which is used in execution of the program 1833. This data may be stored as part of the instruction or in a separate location 1864 within the ROM 1860 or RAM 1870.

In general, the processor 1805 is given a set of instructions, which are executed therein. This set of instructions may be organised into blocks, which perform specific tasks or handle specific events that occur in the tablet device 1801. Typically, the application program 1833 waits for events and subsequently executes the block of code associated with that event. Events may be triggered in response to input from a user, via the user input devices 1813 of FIG. 18A, as detected by the processor 1805. Events may also be triggered in response to other sensors and interfaces in the tablet device 1801.

The execution of a set of the instructions may require numeric variables to be read and modified. Such numeric variables are stored in the RAM 1870. The methods described use input variables 1871 that are stored in known locations 1872, 1873 in the memory 1870. The input variables 1871 are processed to produce output variables 1877 that are stored in known locations 1878, 1879 in the memory 1870. Intermediate variables 1874 may be stored in additional memory locations in locations 1875, 1876 of the memory 1870. Alternatively, some intermediate variables may only exist in the registers 1854 of the processor 1805.

The execution of a sequence of instructions is achieved in the processor 1805 by repeated application of a fetch-execute cycle. The control unit 1851 of the processor 1805 maintains a register called the program counter, which contains the address in ROM 1860 or RAM 1870 of the next instruction to be executed. At the start of the fetch execute cycle, the contents of the memory address indexed by the program counter is loaded into the control unit 1851. The instruction thus loaded controls the subsequent operation of the processor 1805, causing for example, data to be loaded from ROM memory 1860 into processor registers 1854, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1833, and is performed by repeated execution of a fetch-execute cycle in the processor 1805 or similar programmatic operation of other independent processor blocks in the tablet device 1801.

As seen in FIG. 18A, the (tablet) device 1801 is configured for communication with the image capture apparatus 250 via a connection 1821 to the network 230. In this specific example, the image capture apparatus 250 is shown interfaced to the network 230 via a wireless video transmitter 1899, such as the Teradek Cube™ device mentioned above, which forms an interconnection 1891. More generally, the image capture apparatus 250 may have a wireless (e.g. WiFi) connection 1892 direct to the network 230 via which control and status signals may be exchanged, and the connection 1891 via the wireless transmitter 1899 is used essentially exclusively for streaming video signals from the capture apparatus 250 to the network 230. In some implementations, the wireless video transmitter may be integrated with the image capture apparatus 250 and a single wireless connection (perhaps with multiple channels) with the network 230 may be established.

Collaborative Annotation Process Overview

Figure 3:
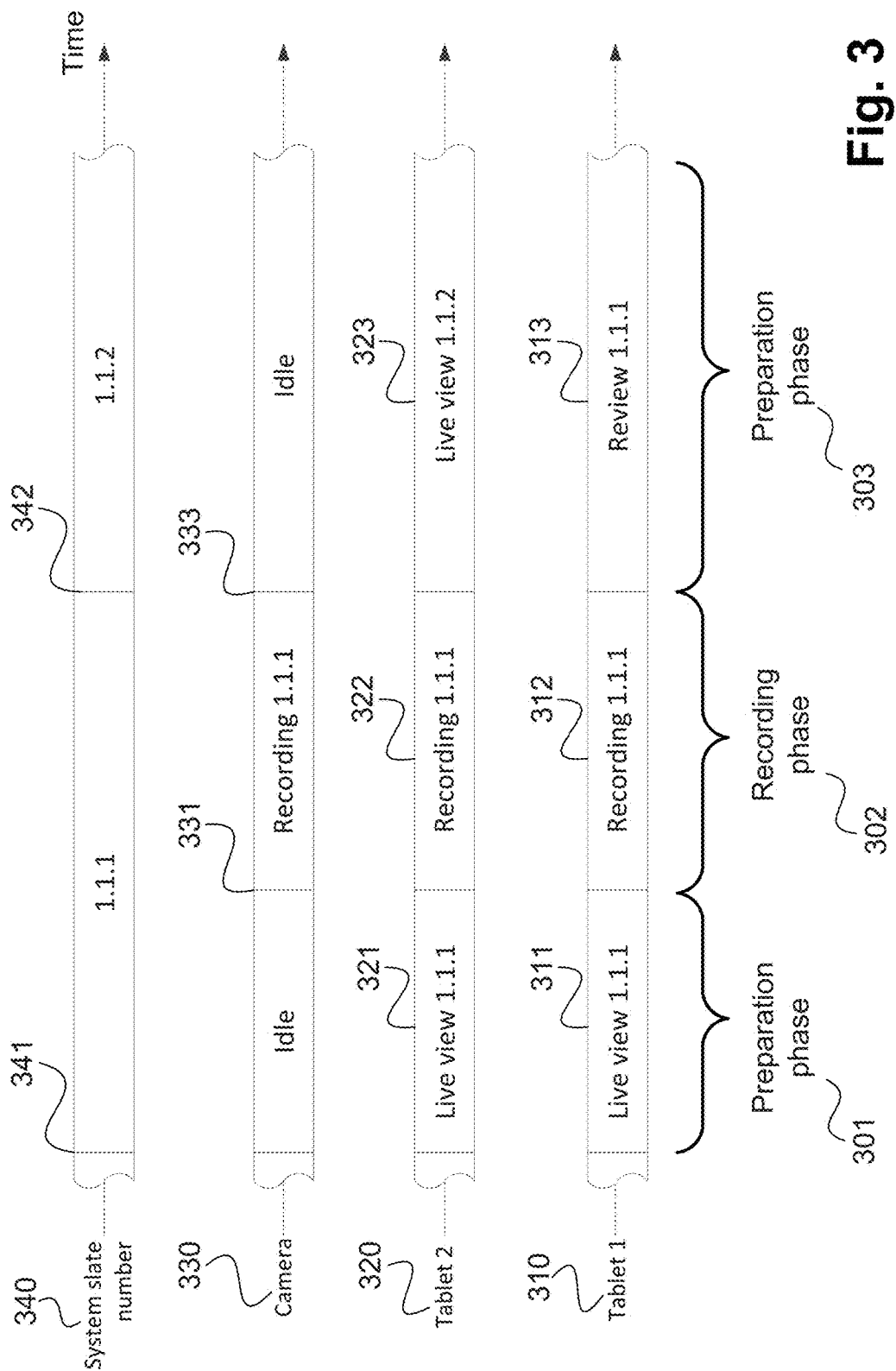
FIG. 3 is a schematic timing diagram of processes for components of the architecture of FIG. 2.

A typical collaborative annotation process will now be described with reference to FIG. 2 and FIG. 3 in which each of the tablet devices 210 and 220 execute an application, such as the application program 1833, providing for the collaborative annotation of a video sequence according to the principles described herein. The status of the first tablet device 210 is represented as a timeline 310 on FIG. 3. The status of the secondary tablet device 220 is represented as a timeline 320 on FIG. 3. The status of the video camera 250 is represented as a timeline 330 on FIG. 3.

A common practice that a video production team follows during a film production stage 130 is to have a preparation phase followed by a recording phase. During a preparation phase 301 seen in FIG. 3, members of the video production team prepare the shooting environment for the next recording phase 302. The preparation steps may include lighting setup, camera settings setup, crane position adjustment etc. One of the important steps of the preparation phase is to update 341 the slate number for the next recording phase 302. This slate number will be referred to as the system slate number 340 hereafter.

In the described arrangement, the system slate number 340 that is setup during the preparation step 301 is entered into the application 1833 running on the tablet devices 210 and 220. In one implementation, the system slate number is entered into one of the tablet devices via the user interface. Once the system slate number is entered, the system slate number is automatically transmitted from the one tablet device to other tablet devices via the communications network 230 through execution of the application 933. In other implementations, the system slate system number can be entered to each of the tablet devices 210 and 220 individually by direct user input on the user interface.

During the preparation phase the tablet devices 210 and 220 are able to live view the video stream (311 and 321) from the video camera 250. During the live view, the video content displayed on the screen 1814 of the tablet devices 210 and 220 is associated with the system slate number 340.

During the recording phase, the beginning of which is often indicated by a command from the director, the camera 250 starts recording 331 a video sequence, as seen in the timeline 330, into a video file 251. When the recording phase starts 331, the system slate number 340 remains unchanged. At some point of the video production process, the captured video file 251 is associated with the system slate number 340 that was setup during the preparation phase 301. The end of the recording 333 is often indicated by a command from the director. As seen in FIG. 2 the captured video file 251 is a high-resolution, raw video (.hd) file.

In the described arrangement, when the camera 250 starts recording 331, each of the tablet devices 210 and 220 also start a corresponding recording of the live video stream 312 and 322 from the video camera 330 into a file to produce a replica "proxy" video file, seen in FIG. 2 as files 212 and 222 respectively. The recording of "proxy" files on the tablet devices 210 and 220 continues until the camera 250 stops recording 333. At some point, the recorded "proxy" video files are associated with the system slate number 340 that was entered 341 during the preparation phase 301. In one implementation, the determination step of when the tablet devices 210 and 220 start and stop recording "proxy" video file is implemented by requesting the camera recording status via an API of the video camera 250. In other implementations, the user may determine when to start the recording of the "proxy" video file and initiate the recording process manually via the user interface on the tablet devices 210 and 220, for example when the director indicates to start or to stop recording. The proxy files 212 and 222 are typically recorded at a resolution lower than that recorded by the camera 250, for example using any one of a number of encoding formats, such as MPEG, H.264 or HEVC, and such is indicated in FIG. 2 as encoded (.mov) files.

After the recording phase 302, it is typical that the video crew moves on to a next preparation phase 303 for the next take. During the next preparation phase 303 a new system slate number is setup 342. The tablet device 220 may continue displaying live view video stream 323 from the camera 250 according to the timeline 320. The tablet device 210 may be changed to the mode of playing back 313 the recorded "proxy" video file 212 according to the timeline 310. If a tablet device is playing back a "proxy" file, then the system slate number 340 is ignored, and the slate number associated with the "proxy" file is used for computation on the corresponding device.

During any of the phases of the production stage 130, a user of a tablet device 210, 220 according to the application 1833 is able to annotate video content being displayed on the screen and is able to share the annotation with other tablet devices.

An exemplary procedure of the annotation sharing process will now be described. The user of the first (primary) device 210 is viewing a video sequence. The video sequence can be a live viewed video stream 311 from the video camera 250, or playback 313 of a recorded "proxy" video file 212. As seen in FIG. 2, while the user is viewing the video sequence on the corresponding display 1814 of the first device 210, the user applies an annotation 211 to a portion of a video sequence. For example, the user, who may be director, may use a touch gesture, represented at 290, on the touch screen 1814 to draw an arrow 211 pointing at content of the displayed scene, such as a person's hat. The drawn arrow 211 is interpreted by the application 1833 as an annotation, which in this example aims to indicate that the hat on the person's head is badly positioned and should be adjusted before the next take.

After the annotation 211 is created, the annotation 211 is transmitted from the first device 210, operating as a source device, via the communications network 230 to the secondary device 220, that then operates as a destination display device. The annotation 211 is received on the secondary tablet device 220. Once the annotation is received on the secondary device 220, the annotation can be stored in the internal storage module 1809, for example in a data structure or database format. Upon receiving the annotation 211, a display representation 221 of the annotation 211 may be generated on the screen 1814 of the secondary tablet device 220. A video annotation notification 223 may also be generated with one or more display characteristics.

Figure 4A:
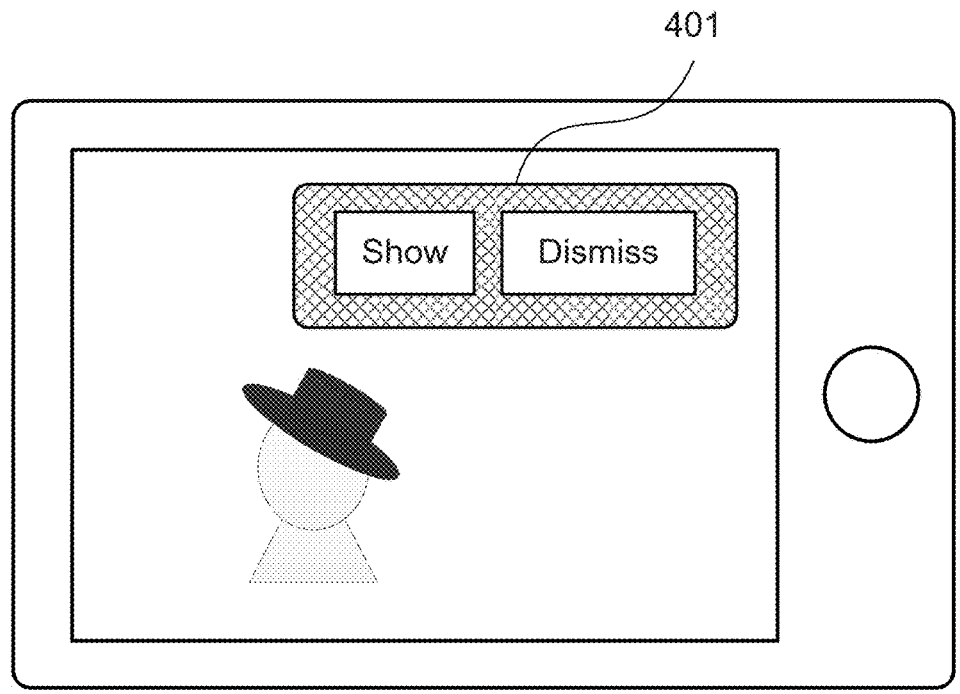
FIG. 4A is a schematic representation of a tablet device of FIG. 2 showing an annotation notification popup dialog box.

One example of a video annotation notification is a popup dialog message box. The popup dialog message box 401, described with reference to FIG. 4A, is an element of the user interface presented on the screen of an on-set tablet device. The popup message box 401 may require a user input. For example, the popup message dialog box 401 may present "Show" and "Dismiss" icons (buttons), upon actuation (pressing) of which, the received annotation may be either presented to the user or discarded respectively. Other actions may also be presented such as "Remind later", "Show all automatically" etc. The popup dialog message box 401 will be referred to as a Type 1 annotation notification hereafter.

Figure 4B:
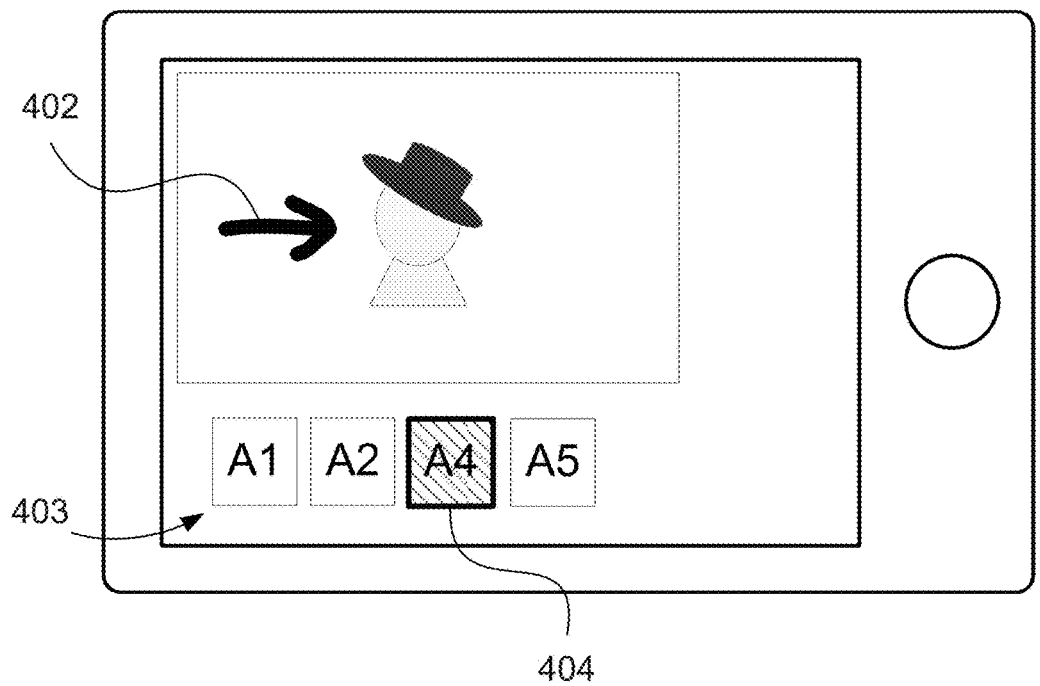
FIG. 4B is a representation similar to FIG. 4A but of an annotation list.
Figure 5:
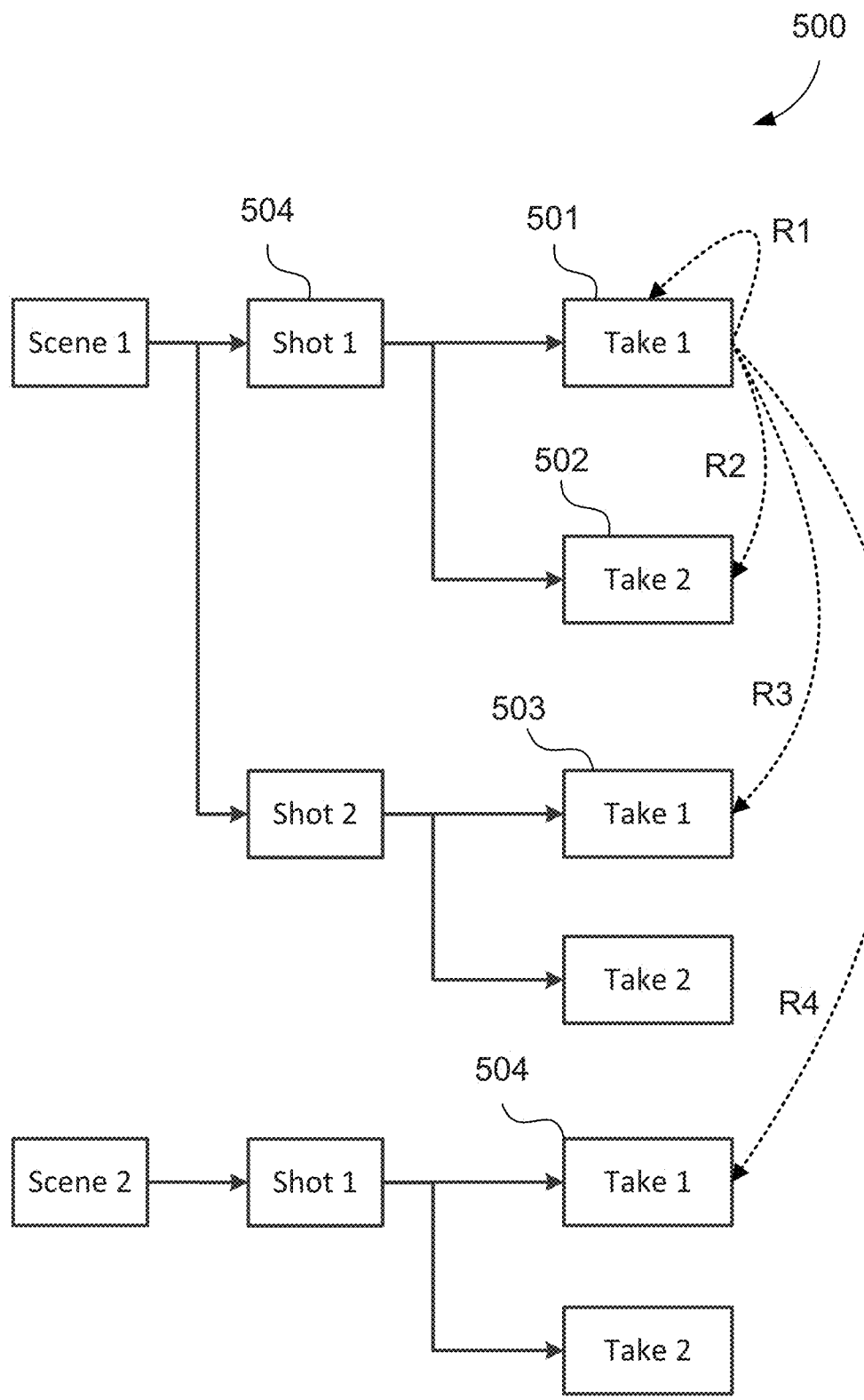
FIG. 5 illustrates a video production hierarchy.
Figure 6:
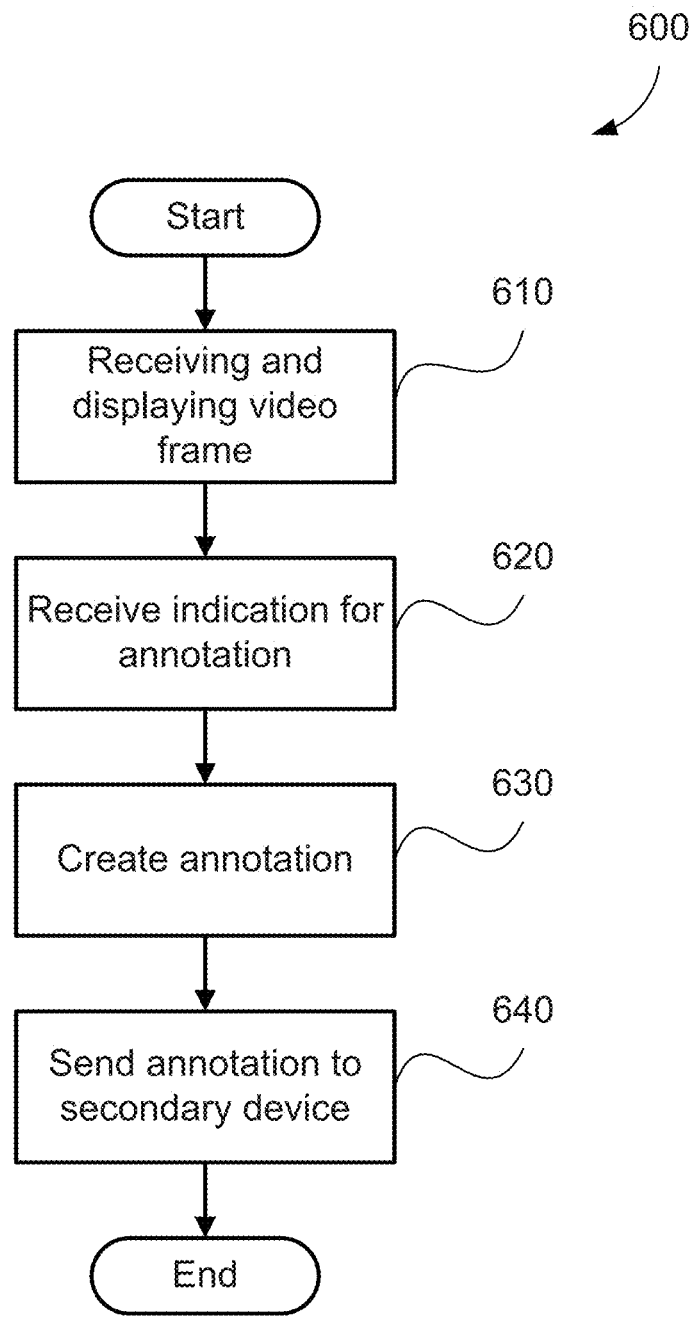
FIG. 6 is a schematic flow diagram of a method of annotating a video sequence.

Another type of a video annotation notification, described with reference to FIG. 4B, can be in a form of highlighting the received annotation in an annotation list 403. The annotation list 403 is a user interface element that lists annotations. The annotation list 403 may present all annotations stored in the internal storage module 1809 of the secondary device 220. Alternatively, the annotation list 403 may present a selected subset of annotations stored the internal storage module 1809, where the selection can be made based on the associated with the annotation metadata such as slate number, timestamp, category, type, etc. The annotation list may include or may not include the annotation received from the first tablet device 210. In FIG. 4B, four annotations A1, A2, A4 and A5 are presented in an annotation list 403, and the A4 annotation 404 in the annotation list 403 is overlayed by a colored layer to highlight the annotation 404 amongst other annotations in the annotation list 403. The highlighted layer may have a variable transparency value. This type of notification will be referred to as a Type 2 annotation notification from hereafter.

The annotation notification can also be the presentation 402 of an annotation itself on the screen, as also seen in FIG. 4B. This type of annotation notification will be referred to as a Type 3 annotation notification hereafter.

A detailed description of the collaborative annotation process 200 will now be provided.

At any time during video production process, the user of the first device 210 is able to apply an annotation 211 to a portion of a video sequence. A method 600 of applying an annotation to a portion of a video sequence and sending the annotation to a secondary device is described hereafter with reference to FIG. 6. The method 600 may be implemented by one or more submodules of the application 1833 stored on the memory 1806, and controlled by execution of the processor 1805 of the first device 210.

The method 600 is executed during review of a video sequence. This may be during capture of the video sequence from the video camera 250 or during review of the recorded "proxy" video file 212. In one example implementation, the recorded "proxy" video file 212 resides on the tablet device 210 storage memory 1809. In alternative implementations, the recorded "proxy" video file 212 may reside on a separate device, for example on the video camera 250, on the secondary tablet device 220, or on the collaboration server 240 etc.

The method 600 starts at a step 610 when the video sequence is displayed by the tablet device 210. The video sequence displayed at the step 610 is received in real-time from the video camera 250 or is played back from the recorded video file 212.

At any time during display of the video sequence by the touch screen 1814, the user is able to initiate an annotation by executing one of a defined set of gestures to operate the touch screen 1814. The method 600 executes on the processor 1805 to progress to a step 620 upon operation of the touch screen. At the step 620, the touch screen 1814 operates to receive the gesture executed by the user during viewing of the video sequence. In receiving the gesture, the tablet device 210 operates to receive an indication from the user. This typically involves comparing the received gesture with the defined set of gestures to determine a match. Where a match is found, the matched gesture is interpreted as the desired annotation.

The method 600 executes on the processor 1805 to progress to a step 630. At step 630, based on the matched gesture received at step 620, the application 1833 executes to store the corresponding annotation and associated annotation metadata in the storage memory of the tablet device 210. The metadata for the annotation includes the slate number associated with the video sequence and may include annotation type, annotation subject, the temporal and spatial extent for the annotation, annotation priority, voice notes, metadata associated with the annotated video sequence etc. This information, and particularly the slate number and temporal metadata, identifies at least a source position of the annotation in the video sequence.

The method 600 executes on the processor 1805 to progress from the step 630 to a step 640. The step 640 executes to send the annotation and its associated metadata to the secondary tablet device 220. The step 640 sends the annotation directly to the secondary device via the communication network 230. In the alternative arrangement, the step 640 may send the annotation to the collaboration server 240. The collaboration server may perform processing of the annotation, and then the collaboration server 240 sends the annotation to the secondary tablet device 220 if necessary.

With the exception of the user gesturing on the tablet device 210 to create the annotation, each of the steps of the method 600 operate without further user interaction as part of the execution of the application 1833. For example, the sending of the annotation at step 640 may be performed by assembling the annotation and associated metadata into a communication package and direct transfer of that package over the communications network 230 according to established network protocols.

Figure 7:
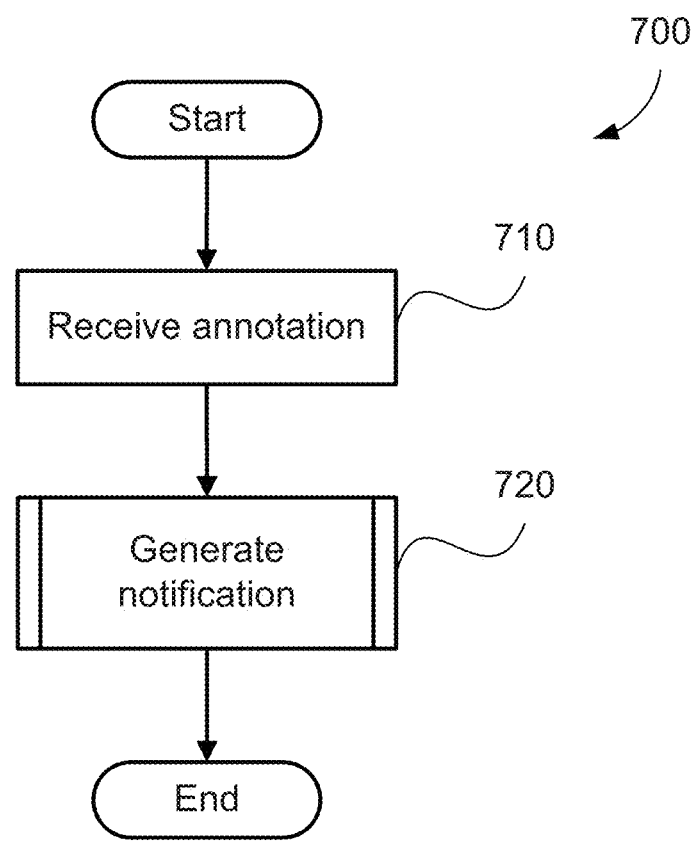
FIG. 7 is a schematic flow diagram of a method to receive and process an annotation created according to the method of FIG. 6.

A method 700, described with reference to FIG. 7, is executed to receive and process the annotation created using the method 600. In one implementation, the method 700 is executed on the secondary tablet device 220 as part of the application program 1833. In alternative implementations, the method 700 may be executed on the collaboration server 240.

The method 700 starts at a step 710 to receive the annotation created in the method 600. This, for example, may involve receiving the aforementioned communications package according to the network communications protocols. The received annotation may then be stored in the memory 1809 of the tablet device 220. Once the annotation is received at the step 710, the method 700 executes on the processor 1805 to progress to a step 720. At the step 720, the application 1833 executes to determine one or more display characteristics of a notification for the annotation.

In a preferred implementation, a method 800 is used at the step 720 to determine video annotation notification display characteristics. The method 800 is described hereafter with reference to FIG. 8. In an alternative implementation, a method 1500 is used at the step 720 to determine video annotation notification display characteristics. The method 1500 is described hereafter with reference to FIG. 15.

Figure 8:
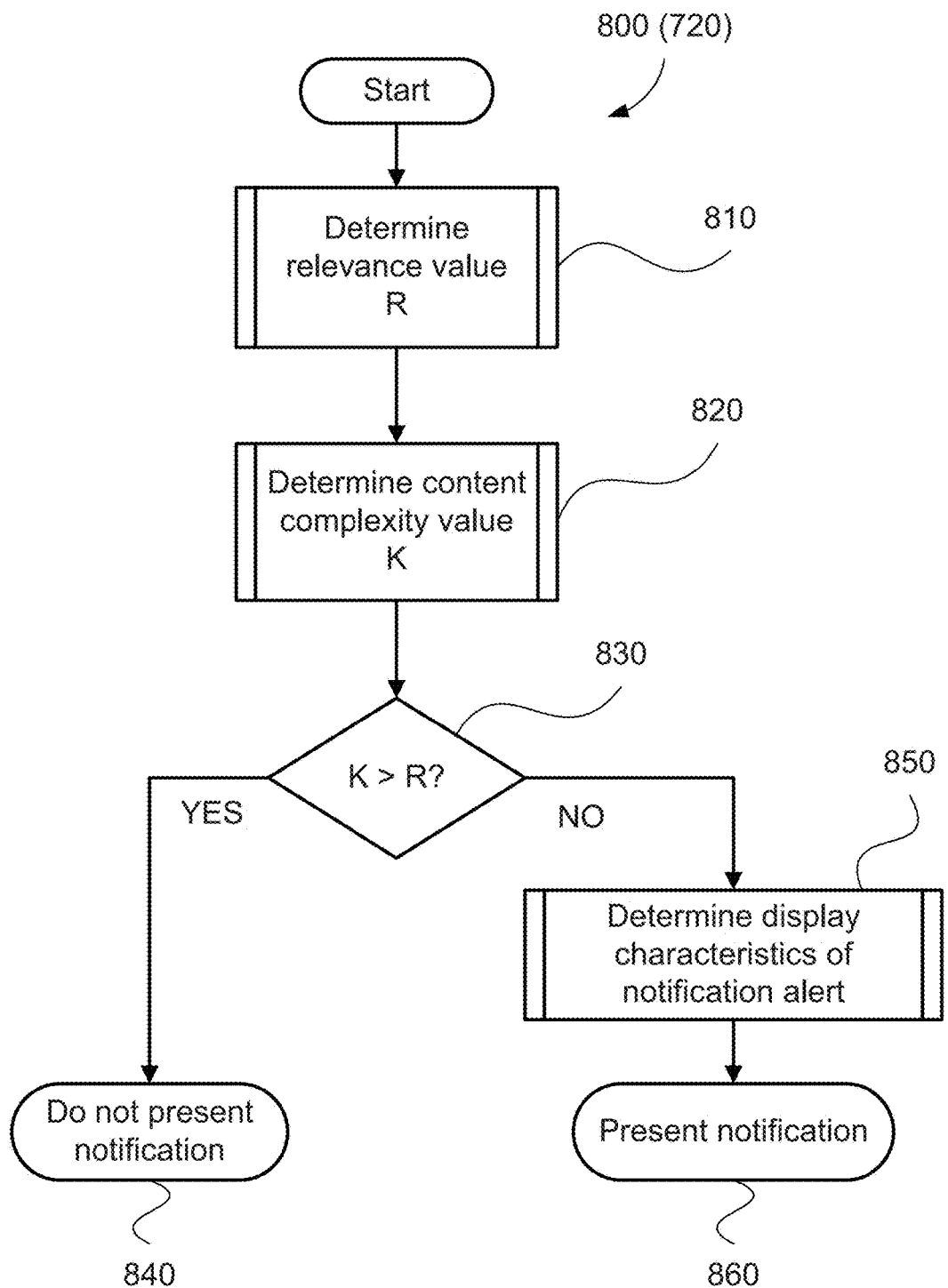
FIG. 8 is a schematic flow diagram of one method to generate a notification that may be used in the method of FIG. 7.

With reference to FIG. 8, the method 800 of determination of annotation notification display characteristics will now be described. The method 800 may be performed on the first device 210, the second device 220, or the server 240.

The method 800 starts at a step 810 to where the processor 1805 executes the application 1833 to determine a relevance value R for the annotation received at the step 710. A preferred method 900 of computing the relevance value R is executed at the step 810. The method 900 is described hereafter with reference to FIG. 9.

After step 810, the method 800 proceeds to execute a step 820 for determination of a content complexity value K. A preferred method 1000 of computing the content complexity value K as executed at the step 820, is described hereafter with reference to FIG. 10.

Once the relevance value R and the content complexity value K are determined, the method 800 proceeds to a determination step 830. In one implementation, the determination step 830 may be executed as a comparison operation of the content complexity value K and the relevance value R. If the content complexity value K is greater than the relevance value R, then the annotation notification is not generated and the method 800 proceeds to an exit step 840. If the content complexity value K is not greater than the relevance value R, then the method 800 proceeds from the step 830 to a step 850. The step 850 is executed to determine one or more display characteristics of the annotation notification. In other implementations, the determination step 830 is not executed, and the process 800 proceeds from the step 820 to the step 850 directly. A method 1100 of determining of one or more annotation notification display characteristics as executed at the step 850 is described hereafter with reference to FIG. 11.

After the step 850 the method 800 proceeds to a step 860 to present on the screen 1814 of the tablet device 220 an annotation notification for the annotation, where the annotation notification is displayed with the display characteristics determined at the step 850.

Figure 9:
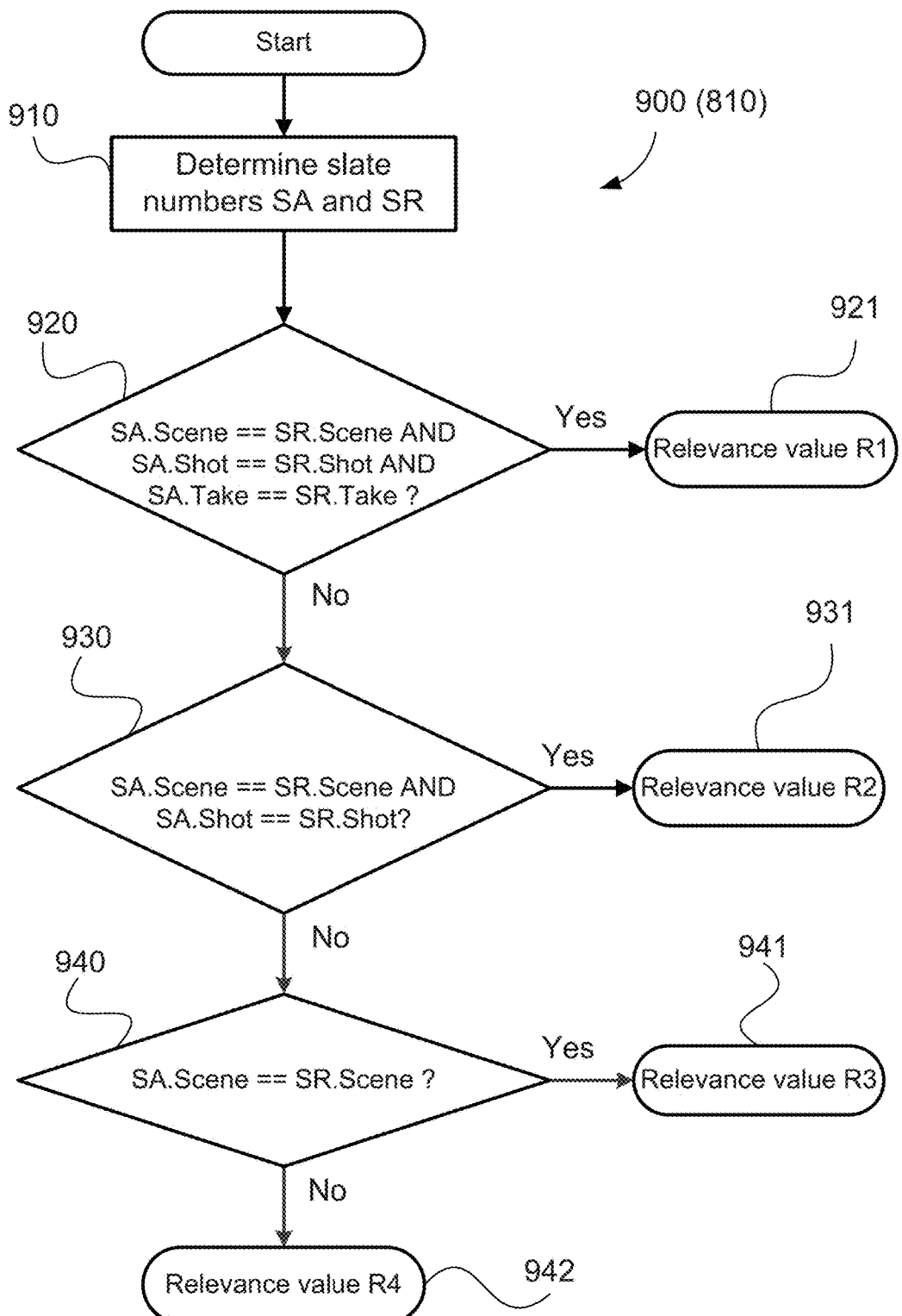
FIG. 9 is a schematic flow diagram of a method of determining relevance value.

With reference to FIG. 9, the method 900 of determining the relevance value R will now be described. The method 900 is executed to define the relevance of the annotation created on the first tablet device 210 to the video content being displayed on the screen of the secondary tablet device 220 which, as described above, need not be the same. In the described arrangement, the relevance is determined based on (a) a position A in the video production hierarchy of the annotated video content, (b) a position B in the video production hierarchy of the video content displayed on the secondary tablet device, and (c) the distance between position A and position B in the video production hierarchy. The method 900 may be performed on the first device 210, the second device 220, or the server 240.

In preferred arrangements, the source position of video content in the video production hierarchy is defined by the slate number (SA). In other arrangements the source position may be defined by a combination of information including slate number, time, frame number or count, etc. A conceptual representation of a video production hierarchy 500 is presented on FIG. 5. As seen, the hierarchy 500 is based on a relative tree based on Scene, Shot and Take number components associated with the production. Any hierarchy will require at least two such hierarchical components. Video contents that are closer in the production hierarchy are accorded a higher relevance value. For example, a video content at the position 1.1.1 (marked as 501) is more relevant to the video content at the position 1.1.2 (marked as 502) than to the video content at the position 1.2.1 (marked as 503).

The method 900 starts at a step 910. At the step 910 the processor 1805 executes to determine a slate number SA and a slate number SR. The slate number SA is the slate number associated with the annotation that was created on the first tablet device 210 at the step 630. The slate number SR is the slate number associated with a video sequence being displayed on the secondary tablet device 220 at the moment of receiving the annotation from the first tablet device 210. The slate number SR may be considered a destination position in the video production hierarchy for video content displayed on the second tablet device 220.

At the step 910 the determined slate numbers SA and SR are converted, if necessary, to the abovementioned format A.B.C, where the A component corresponds to Scene value, the B component corresponds to Shot value, the C component corresponds to Take value.

Once the slate numbers SA and SR are determined at the step 910, the method 900 checks the correspondence between the slate numbers SA and SR in steps 920, 930 and 940, proceeds initially to execute a determination step 920.

At the determination step 920, the process 900 executes to checks the equality of the Scene component of the slate number SA to the Scene component of the slate number SR; the equality of the Shot component of the slate number SA to the Shot component of the slate number SR; and the equality of the Take component of the slate number SA to the Take component of the slate number SR. If all equality checks executed at the step 920 are satisfied, then the method 900 executes to progress to a step 921. At the step 921 the relevance value R is assigned value R1 and the method 900 stops at the step 921. If one or more of the equality checks executed at the step 920 is not satisfied, then the method 900 executes to progress from the step 920 to a determination step 930.

At the determination step 930, the process 900 executes to checks the equality of the Scene component of the slate number SA to the Scene component of the slate number SR; and the equality of the Shot component of the slate number SA to the Shot component of the slate number SR. If all equality checks executed at the step 930 are satisfied, then the method 900 executes to step 931. At the step 931 the relevance value R is assigned value R2 and the method 900 stops at the step 931. If one or more of the equality checks executed at the step 930 are not satisfied, then the method 900 executes to progress from the step 930 to a determination step 940.

At the determination step 940, the process 900 executes to checks the equality of the Scene component of the slate number SA to the Scene component of the slate number SR. If the equality check executed at the step 930 is satisfied, then the method 900 executes to step 941. At the step 941 the relevance value R is assigned value R3 and the method 900 stops execution at the step 931. If the equality check executed at the step 940 is not satisfied, then the method 900 executes to progress to step 942. At the step 942 the relevance value R is assigned value R4 and the method 900 stops execution at the step 942.

In one implementation, the abovementioned values R1, R2, R3 and R4 are defined as in the following Table 1.

TABLE 1

| R | Relevance value example values |
|---|---|
| R1 | 100 |
| R2 | 80 |
| R3 | 20 |
| R4 | 0 |

In an implementation according to Table 1, 100 is defined as the maximum possible value for the relevance value R and for the content complexity value K; and 0 is defined as the minimum possible value for the relevance value R and for the content complexity K. In other implementations, the values R1, R2, R3 and R4 may be defined differently.

An exemplary result produced by executing the method 900 will now be described. In a first example, the slate number SA associated with the annotation is 1.1.1, and the slate number SR of the video content being viewed on the secondary device 220 is 1.1.1. By executing the method 900, the relevance value R becomes 100. As 100 is the maximum possible relevance R value, the result is that all annotation notifications will be presented to the user as determined at the step 830. This behaviour is often desirable, because in the case where the slate number SR is equal to the slate number SA, the result is that the annotation created on the first tablet device 210 is applied to the same replica of the video content currently being viewed on the secondary tablet device 220. Thus the relevance of the received annotation to the video being displayed on the screen of the secondary tablet device 220 is at a maximum.

In another example, the slate number SA associated with a received annotation is 1.1.1, and the slate number SR of the video content being viewed on the secondary device 220 is 1.1.2. By executing method 900 the relevance value R becomes 80. In such a case the relevance value R is less than the maximum possible value, and the result is that almost all, but not all, annotation notifications will be presented to the user as determined at the step 830. This behaviour is often desirable, because if the Scene and the Shot components of the slate number SR and the slate number SA are equal respectively, it means that the annotation is applied to a different take of the same shot relative to the video content that is being viewed on the secondary tablet device 220. In the film production process, different takes 501 and 502 of the same shot 504 as seen in the hierarchy 500 of FIG. 5 often have very similar content; for example an actor says the same phrase in each take but with a slight variation in his voice. Thus the relevance of the received annotation to the video being displayed on the screen of the secondary tablet device 220 is high, but not maximum.

It has been demonstrated how to determine the relevance of video content being annotated on the first tablet device 210 to the video content being displayed on the screen of the secondary tablet device 220, where the determination is based on the distance in positions of the video contents in the video production hierarchy.

Figure 10:
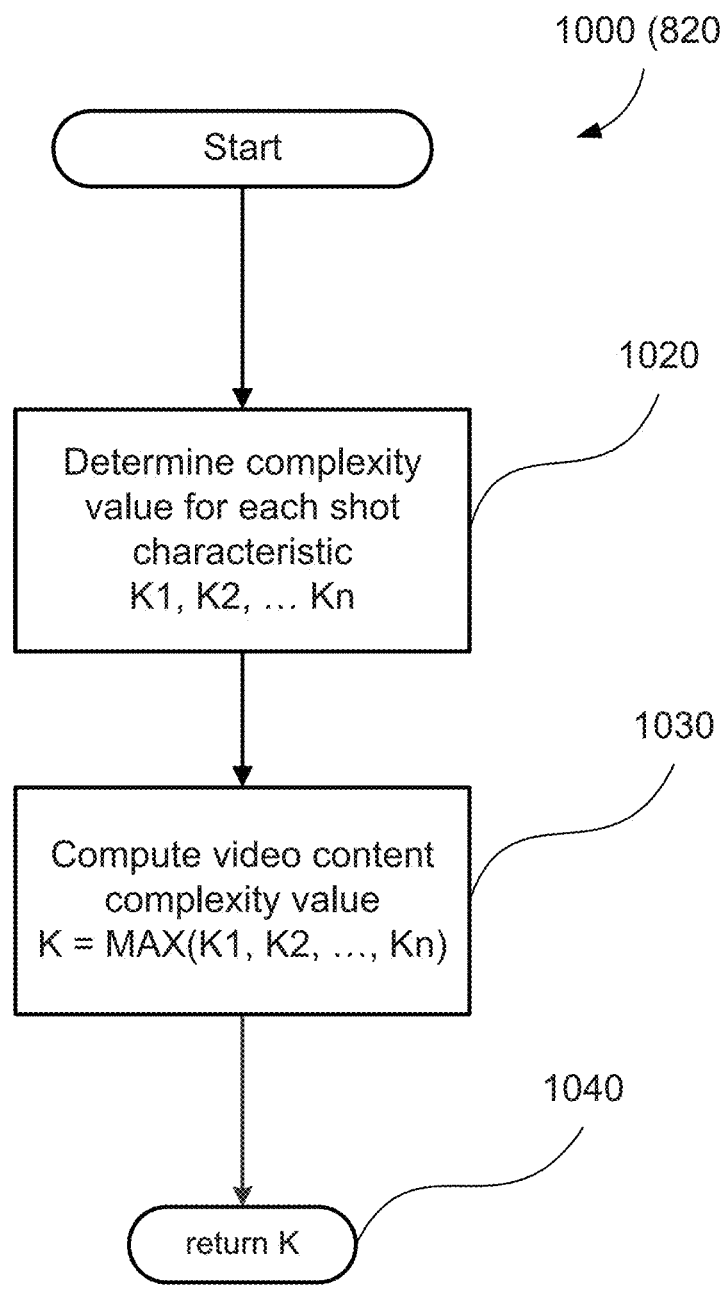
FIG. 10 is a schematic flow diagram of a method of determining a content complexity value.

A method 1000 of determining content complexity value K will now be described with reference to FIG. 10. The method 1000 may be performed on the first device 210, the second device 220, or the server 240.

The content complexity value K is indicative of the amount of the content complexity, e.g. as indicated by the object motion within the scene. The content complexity value K is a value that is used to represent a range of shot complexities from no shot complexity (e.g. K=0) up to a maximum amount of shot complexity (e.g. K=100). The content complexity value K is computed from shot characteristics.

Shot characteristics are metrics that are derived from video content metadata or video content itself. Shot characteristics may come from different sources. For example, shot characteristics can be acquired from video content metadata (e.g. from direct user input, imported from shot-list metadata, etc.). Shot characteristics may also be derived from video content analysis (e.g. from object or feature detection and recognition, from video motion estimation, etc.).

Execution of the method 1000 starts with step 1020. Step 1020 is executed by the processor 1805 to compute a set of complexity values K1, K2, . . . , Kn from each shot characteristic of the annotated video, where the value Ki corresponds to a shot characteristic (i=1 to n) from which it was computed.

Examples of shot characteristics that can be acquired from a direct user input via the user interface (touch panel 1814) are:

(i) "Shot type"—Close up or Wide angle.
(ii) "Shot dynamism"—A range from Static (i.e. camera is stationary, one person talking to the camera) to Moving (camera is moving, a lot of action happens on the screen).

In one example implementation, the value for "Shot type" shot characteristic may be acquired by manipulating a switch type user interface element on the touch panel 1814, where the switch element has at least two discrete positions, such as "Close Up" and "Wide angle".

The value for "Shot dynamism" shot characteristic is acquired by manipulating a slider type user interface element on the touch panel 1814, where movement of the slider can change the value of Shot dynamism to any value within the range of zero to a predetermined maximum, such as ninety.

In one example implementation, the "Shot type" and "Shot dynamism" characteristics can be assigned complexity values as presented on the following Table 2.

TABLE 2

| Shot characteristic | Complexity value Kn |
|---|---|
| Shot type | Close up = 0, and Wide angle = 50 |
| Shot Dynamism | Range from 0 (Very static) to 90 (A lot of movement). |

An example of computing complexity value Kn by performing video content analysis will now be provided.

A video bitstream encoded using block-based motion compensation includes motion vectors that correlate with motion in the video content. A given motion vector provides a mechanism for copying a block, possibly with filtering applied, e.g. for sub-pixel precision, from a reference frame to produce a predicted block for a current frame. Examples of such encoding arrangements include those according to the H.264 and HEVC standards. Camera panning action may introduce global motion into the video bitstream. Global motion is apparent as a non-zero average of motion vectors of all blocks in a given frame of the video content. More complex types of motion, such as from camera rotation and zooming are also possible. Generally, these more complex types of motion result in relatively small local changes to motion vectors, as each block is relatively small compared to the overall frame size. By measuring the distribution of motion vectors, e.g. using a histogram, a frame motion model can be derived. The frame motion model is indicative of global motion, e.g. with small value motion vectors congregating in lower magnitude bins of the histogram. The frame motion model also indicates the presence of more complex motion, e.g. when many motion vectors congregate in higher magnitude bins of the histogram. One example shot complexity metric finds the median bin in the histogram of motion vector magnitudes and assigns a higher shot complexity value to frames with more motion vectors allocated to bins above the median bin in the histogram. In a static scene, almost all motion vectors are assigned to the lowest few bins of the motion vector histogram. A threshold may be used to detect static scenes, preventing very low motion vectors that are above a given median from leading to an incorrect conclusion of higher shot complexity in such scenes the Kn=0. In one arrangement the value Kn is determined as one hundred multiplied by the result of one minus the result of dividing the quantity of motion vectors in the lowest bin by the total quantity of motion vectors. In such arrangements, when all motion vectors are present in the lowest bin (i.e. have zero of minimal magnitude), Kn is equal to zero. If all motion vectors are present in the highest bin (i.e. have very large magnitudes), Kn is equal to one hundred.

FIG. 14A(1) is a schematic representation of an exemplary reference frame 1452 and FIG. 14A(2) of a corresponding current frame 1456. FIGS. 14A(1) and 14A(2) collectively show an example of how block-based motion compensation operates, and provides the basis for one approach to shot complexity determination. The current frame 1456 includes blocks, such as a block 1459 that are predicted from blocks obtained from a reference frame, such as the reference frame 1452. In the example shown in FIGS. 14A(1) and 14A(2), in comparing the reference frame 1452 and the current frame 1456, a feature has moved spatially. A prediction of the contents of the block 1459 is produced by fetching a reference block 1454 from the reference frame 1452. The location of the reference block 1454 is determined from a motion vector 1458. The motion vector 1458 provides a horizontal displacement from a location in the reference frame 1452 that corresponds to the top left corner of the block 1459 in the current frame 1456. A corresponding vertical displacement may also be determined. This example is repeated for all blocks in the current frame 1456, noting that different block sizes are possible and that blocks in the current frame 1456 may also be 'intra-predicted', i.e. they may not use a reference frame to determine their predicted samples.

FIGS. 14B(1) and 14B(2) show histograms derived from motion vectors. The motion vectors may be obtained using the process illustrated with reference to FIGS. 14A(1) and 14A(2). Histograms 1462 and 1464 show histograms dividing the horizontal and vertical displacements, respectively, into 'bins', each including 16 integer positions. In the example of FIG. 14B(1) the last 'bin' is unbounded, i.e. it includes all displacements greater or equal to 80. Histograms 1466 and 1468 of FIG. 14B(2) are similarly constructed. In the example of FIG. 14B(1), the histograms 1462 and 1464 show statistics derived from a frame with little motion. As a consequence, most of the motion vectors lie in the first bin, i.e. in the range from zero to 15. This indicates that the scene for which these statistics were obtained has low shot complexity. In contrast, the histograms 1466 and 1468 show a distribution of motion vectors with much larger magnitudes, and relatively few motion vectors lying in the first (leftmost) bin. This is indicative of a scene containing complex motion and thus, the scene may be said to have high shot complexity.

More sophisticated methods for measuring shot complexity are also possible. For example, motion vector differences (deltas) may also be used to establish object boundaries, and an image may be segmented into regions, e.g. sets of blocks, within which low motion vector delta magnitudes are detected. Region boundaries would thus generally include larger magnitude motion vectors. The decomposition of each frame into regions can be performed on a frame by frame basis, with the stability of the resulting region decomposition being correlated between frames to give an estimate of the reliability of the region decomposition. Then, a combination of the number of regions and the relative motion at region boundaries (e.g. average motion vector magnitude of blocks forming the boundary between two or more regions) can be used to derive a shot complexity measure.

The above methods for shot complexity rely on motion vectors in the bitstream being correlated with motion in the scene. Although this is generally the case, some video encoders may perform a more limited search that is unable to capture underlying motion of objects between a given frame and the associated reference frames. Examples of such encoders include consumer-grade encoders, e.g. as often used in mobile phones (or 'smart phones') where power consumption constraints prohibit the increased memory bandwidth required for searching over larger portions of a reference frame. Alternative mechanisms for determining shot complexity may also be beneficial. Each frame may be analysed to determine the location of visual 'features', e.g. using the scale invariant feature transform (SIFT) algorithm By applying the SIFT algorithm to consecutive frames, and correlating the resulting features between frames of the video content, a model of the underlying objects can be established. Detection of many relatively stable features, i.e. features that persist over consecutive frames, would provide suitable input for a determination of shot complexity. The absence of features that can be detected over multiple frames is indicative of a failure of the feature detector to detect meaningful features in the video data. For example, the feature detector behaviour is being adversely affected by noise present in the video data. In the presence of stable features (where stability is defined in terms of several frames, corresponding to well under one second duration, and hence useful even for high motion scenes) a measure of the shot complexity is possible. A motion correlation of features between consecutive frames is then performed. If the motion correlation indicates that the detected features are in substantially similar positions, then the shot complexity is assessed as low. If the correlation indicates that the detected features are substantially similar in composition but differ in location between consecutive frames, then the shot complexity is assessed as high. In such an approach, consideration of false feature detection, e.g. due to noisy video content, can be addressed by applying thresholds for the stability (persistence) of feature detection, and the stability of feature location. To accommodate motion of objects within the video data, a 'motion search' whereby feature correlation between frames allows for features to have changed location, to a limited degree, can be used. The amount of determined spatial shift can then contribute to the shot complexity calculation. Thus, a highly detailed scene with little motion would provide a low 'shot complexity' score, whereas a similarly highly detailed scene but with high motion (matching features detected at different locations) would provide a higher shot complexity score. This approach of using SIFT to extract features from video content is one example of 'video content analysis'. Other algorithms for feature extraction and object detection are also possible, e.g. segmenting each frame into 'super pixels' and using a measure of the change in the super pixel decomposition of successive frames as a shot complexity metric.

Returning to FIG. 10, once the complexity values of each shot characteristic K1, K2, . . . , Kn are computed at the step 1020, the method 1000 executes to progress from step 1020 to step 1030. The step 1030 executes to compute the video content complexity value K.

In some implementations, the content complexity value K may be computed as a maximum value of complexity values K1, K2, . . . , Kn.

$$K=MAX(K1,K2,\ldots,Kn).$$

In other implementations, the content complexity value K may be computed as an average value of values K1, K2, . . . , Kn. A weighting coefficient may also be assigned to each of the complexity value, to signify how much the each of the K1, K2, . . . , Kn values contribute to the content complexity value K.

The method 1000 finishes the execution of the step 820 at the step 1040.

Figure 11:
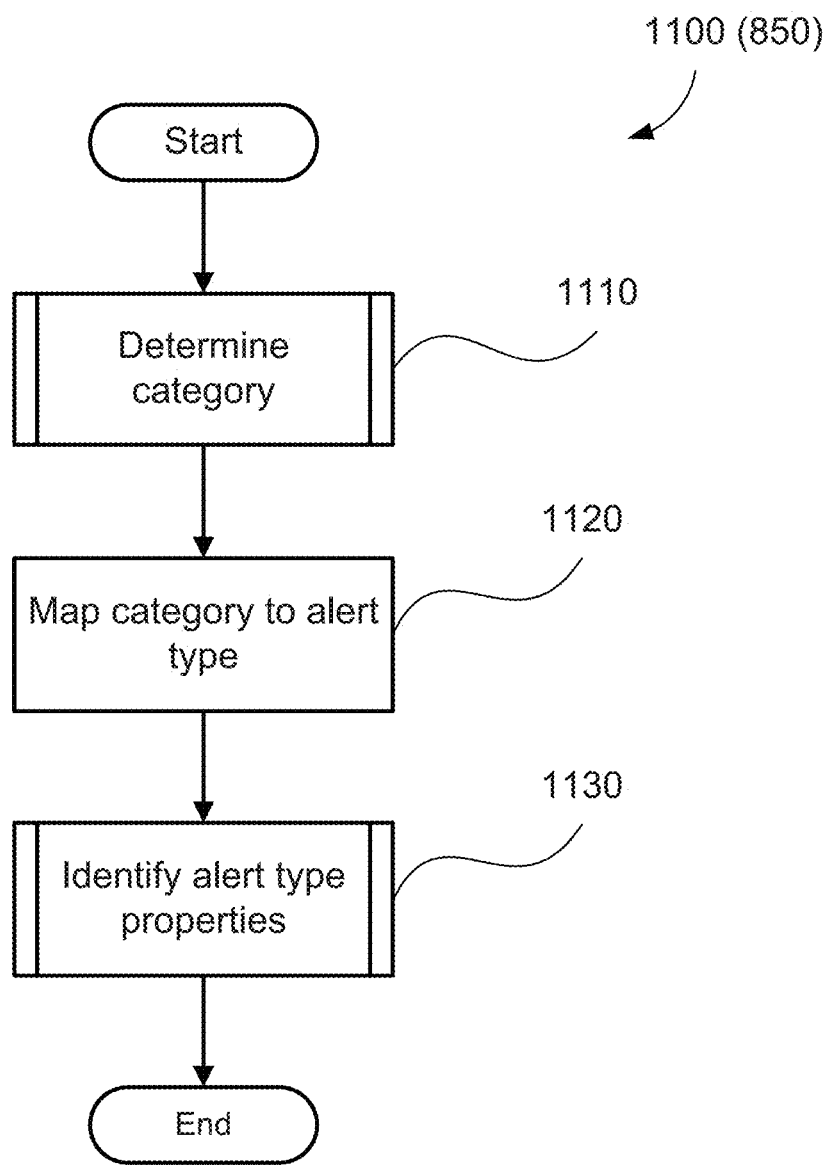
FIG. 11 is a schematic flow diagram of a method of determining display characteristics of a notification alert.

A method 1100 of determination of one or more annotation notification display characteristics will now be described with reference to FIG. 11. The method 1100 starts at a step 1110 to determine annotation notification category AC.

Figure 12:
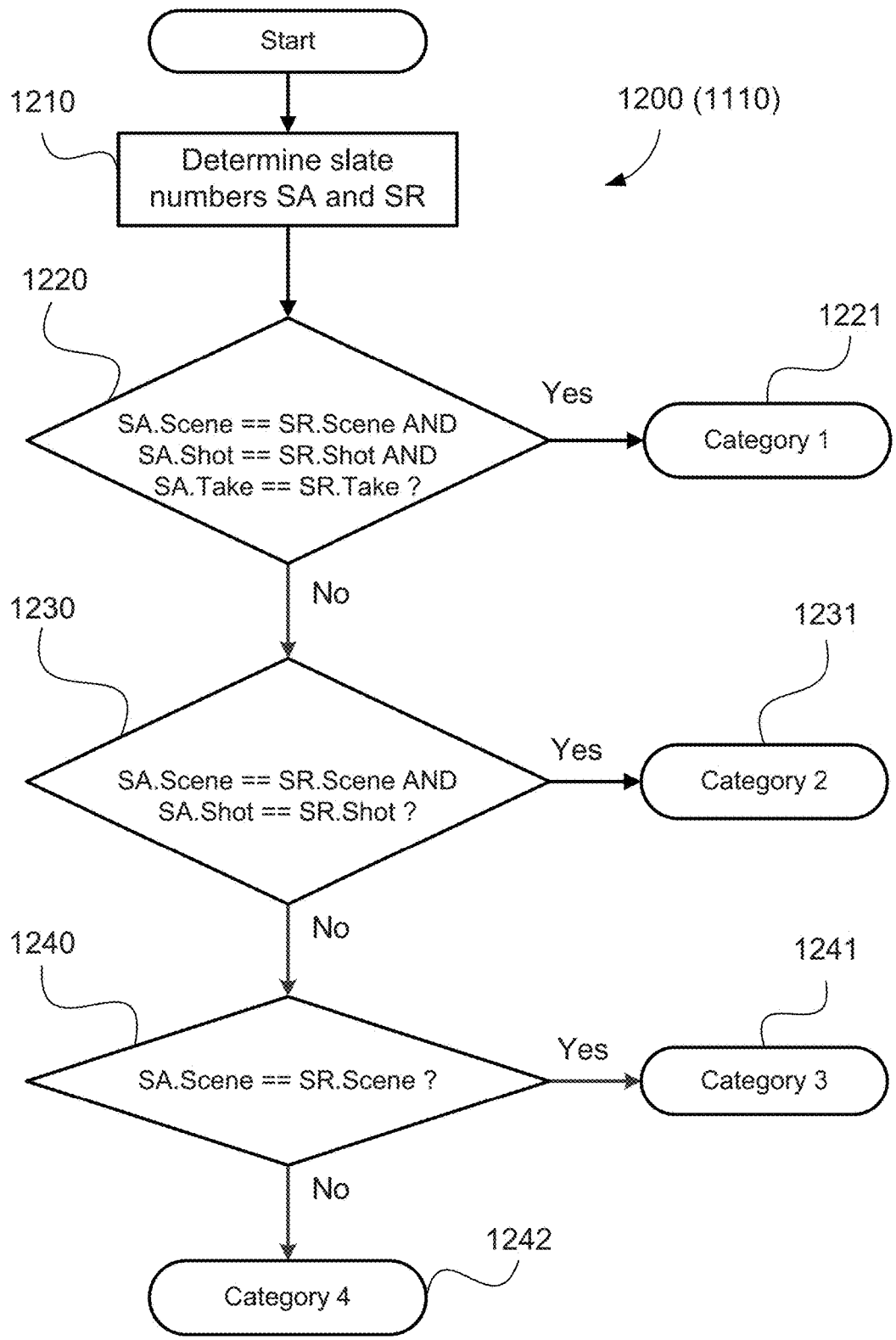
FIG. 12 is a schematic flow diagram of a first exemplary method for determining an alert type.

In one example implementation of the step 1110, a method 1200, described with reference to FIG. 12, is desirably used. The method 1200 may be performed on the first device 210, the second device 220, or the server 240. The method 1200 of determining and selecting annotation notification category, and thus the display characteristics of the annotation, starts at a step 1210. At the step 1210 the process 1200 executes to determine a slate number SA and a slate number SR. The slate number SA is the slate number associated with the annotation that is created on the first device 210 at the step 630. The slate number SR is the slate number associated with a video sequence being displayed on the secondary tablet device 220 on the moment of receiving the annotation from the first tablet device 210.

At the step 1210, the determined slate numbers SA and SR are converted, if necessary, to the abovementioned format A.B.C, where the A component corresponds to Scene value, the B component corresponds to Shot value, and the C component corresponds to Take value.

Once the slate numbers SA and SR are determined at the step 1210, the method 1200 determines a correspondence between the slate numbers SA and SR in steps 1220, 1230 and 1240, proceeding initially to execute a determination step 1220.

At the determination step 1220, the process 1200 checks the equality of the Scene component of the slate number SA to the Scene component of the slate number SR; the equality of the Shot components of the slate number SA to the Shot components of the slate number SR; and the equality of the Take components of the slate number SA to the Take component of the slate number SR. If all equality checks executed at the step 1220 are determined as true, then the method 1200 executes to a step 1221. At the step 1221 the annotation notification category AC is determined to be "Category 1" and method 1200 stops at the step 1221. If one or more of the equality checks executed at the step 1220 fail, then the method 1200 executes from the step 1220 to a determination step 1230.

At the determination step 1230, the process 1200 checks the equality of the Scene component of the slate number SA to the Scene component of the slate number SR; and the equality of the Shot components of the slate number SA to the Shot components of the slate number SR. If all equality checks executed at the step 1230 are true, then the method 1200 executes to select step 1231. At the step 1231 the annotation notification category AC is determined to be "Category 2" and the method 1200 stops at the step 1231. If one or more of the equality checks executed at the step 1230 are not true, then the method 1200 executes from the step 1220 to a determination step 1240.

At the determination step 1240, the process 1200 checks the equality of the Scene component of the slate number SA to the Scene component of the slate number SR. If the equality check executed at the step 1240 is true, then the method 1200 executes to step 1241. At the step 1241 the annotation notification category AC is determined to be "Category 3" and the method 1200 stops execution at the step 1241. If the equality check executed at the step 1240 is not satisfied, then the method 1200 executes to step 1242. At the step 1242 the annotation notification category AC is determined to be "Category 4" and the method 1200 stops execution at the step 1242.

An alternative method 1300 of the annotation notification category AC determination as executed at the step 1110 will now be described with reference to FIG. 13. In the alternative method, a variable C is computed and matched to one of a number of defined ranges.

Figure 13:
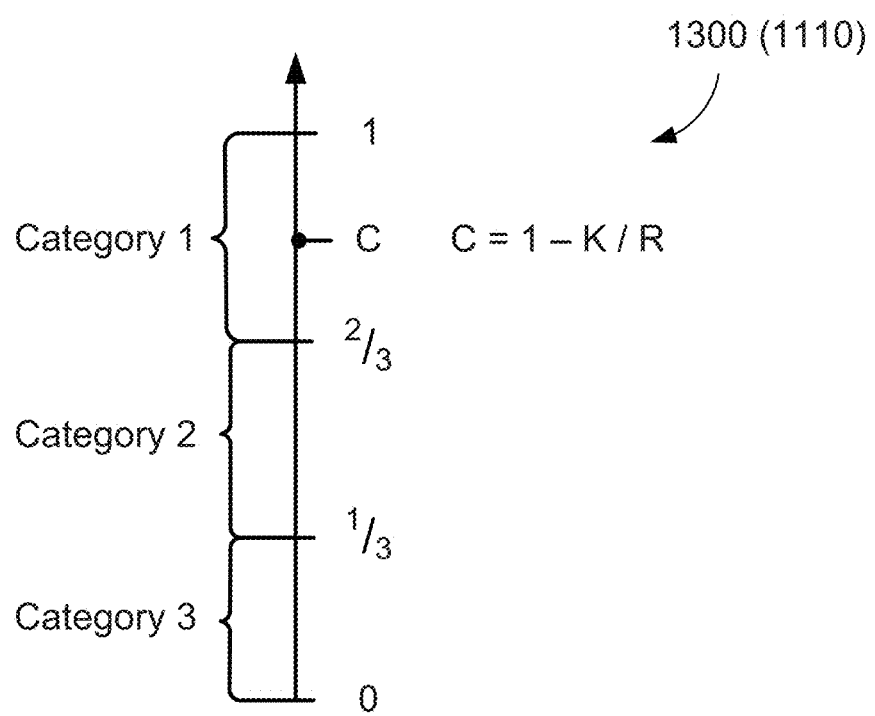
FIG. 13 is a representation of another approach for determining an alert type.

In one example implementation of FIG. 13, three ranges are defined—Range_1=0, ⅓, Range_2=⅓, ⅔ and Range_3=⅔, 1. The variable C is computed as follows $$C=1-K/R$$

where R is the relevance value computed at the step 810 and K is the video content complexity value computed at the step 820. If the value of the variable C falls into the Range_1, then the annotation notification category AC is determined to be "Category 3". If the value of the variable C falls into the Range_2, then the annotation notification category AC is determined to be "Category 2". If the value of the variable C falls into the Range_3, then the annotation notification category AC is determined to be "Category 1".

Referring back to FIG. 11, once the annotation notification category AC is determined at the step 1110, the method 1100 proceeds to execute a step 1120 of category mapping. In one example implementation of the step 1120 the category mapping of the annotation notification can be implemented in the manner as presented on the following Table 3.

TABLE 3

| Category AC | Type of video annotation notification |
|---|---|
| Category 1 | Type 3 |
| Category 2 | Type 1 |
| Category 3 | Type 2 |
| Category 4 | Type 2 |

The notification types are those described above with reference to FIGS. 4A and 4B.

Once the annotation notification type is determined at the step 1120, the method 1100 proceeds from the step 1120 to a step 1130. The step 1130 determines display properties of the annotation notification. In some implementations, the step 1130 may not be executed for some types of annotation notification.

In the current exemplary implementation, the step 1130 is executed if the annotation notification type as determined by step 1120 is Type 2. The step 1130 determines an intensity value of the annotation notification display. The intensity value is a value of the alpha channel of the color that is used as an overlay layer that is highlighting the notification 404 in the list of notifications 403 as reproduced by the touch panel 1814. The alpha channel value ALPHA can be computed as:

$$ALPHA = 1 - K/R,$$

where R is the relevance value computed at the step 810 and K is the video content complexity value computed at the step 820. For example, if the relevance value R is determined to be 80 (very high relevance) and the content complexity value K is 5 (very low complexity), the ALPHA value will be 0.9375, which will highlight the annotation 404 in the annotation list 403 significantly. Alternatively, if the relevance value R is 80 (very high relevance) and the content complexity is 70 (very high complexity), the ALPHA value will be 0.125, which will result in lesser highlighting of the annotation 404. For annotations applied to video contents with higher complexity, an execution of the step 1130 will result in less prominent annotation notifications, and hence less distraction to the user.

Referring back to FIG. 8, once the annotation notification display characteristics are determined at the step 850, the method 800 executes to the step 860 to present the annotation notification if necessary.

In the alternative implementation, the method 1500 is used at the step 720 to determine video annotation notification display characteristics.

Figure 15:
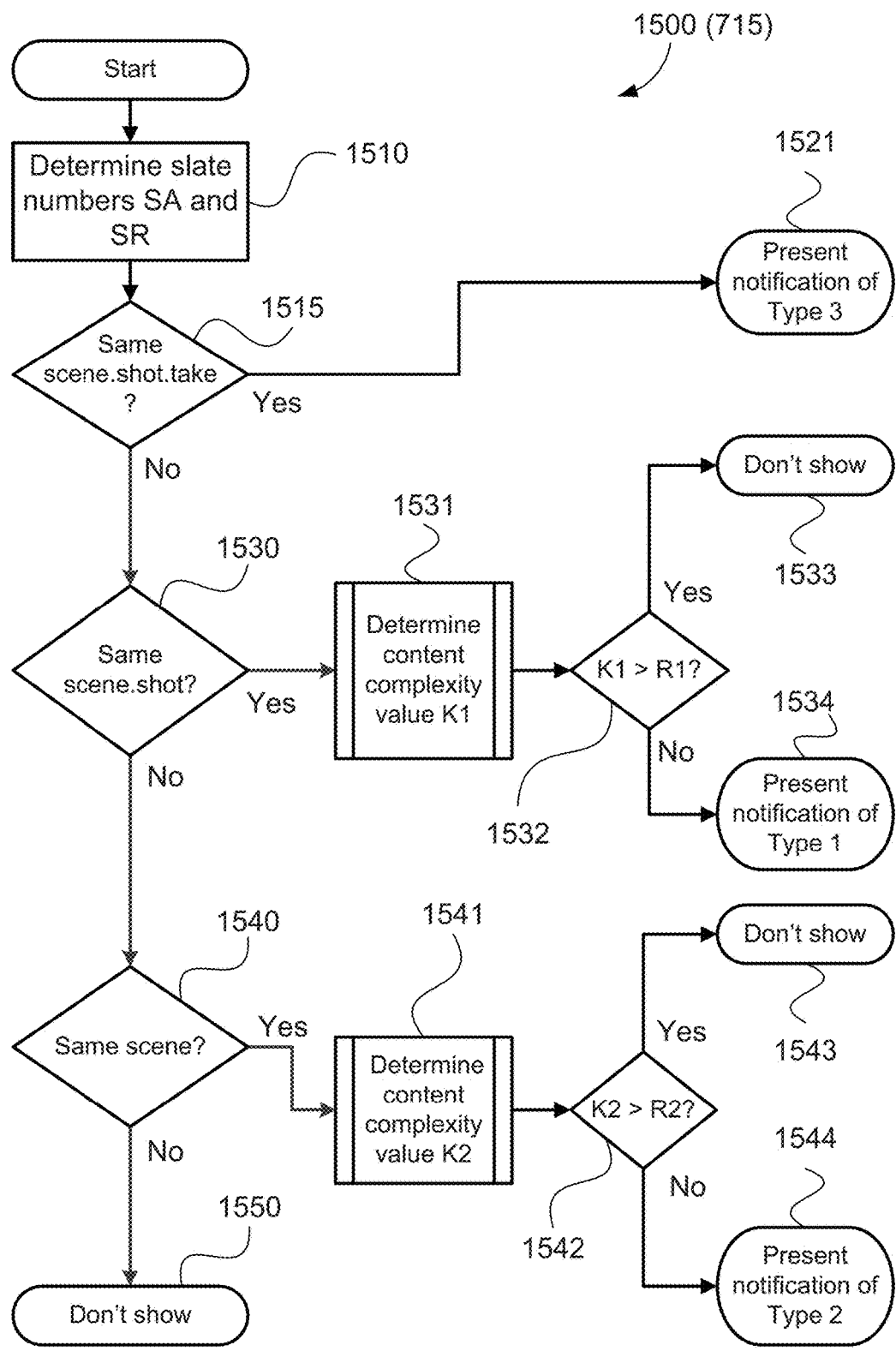
FIG. 15 is a schematic flow diagram of another method to generate a notification that may be used in the method of FIG. 7.

The method 1500 of annotation notification alert generation is now described in more detail with reference to FIG. 15. The method 1500 is executed by the processor 1805 as part of the application 1833 and starts at a step 1510. At the step 1510 the processor 1805 executes to determine a slate number SA and a slate number SR. The slate number SA is the slate number associated with the annotation that is created on the first tablet device 210 at the step 630. The slate number SR is the slate number associated with a video sequence being displayed on the secondary tablet device 220 at the moment of receiving the annotation from the first tablet device 210. The slate numbers are typically stored in the memory 1809.

At the step 1510 the determined slate numbers SA and SR are converted, if necessary, to the abovementioned format A.B.C, where A component corresponds to Scene value, B component corresponds to Shot value, C component corresponds to Take value.

Once the slate numbers SA and SR are determined at the step 1510, the method 1500 proceeds to execute a determination step 1520.

At the determination step 1520, the processor 1805 executes to check the equality of the Scene component of the slate number SA to the Scene component of the slate number SR; the equality of the Shot component of the slate number SA to the Shot component of the slate number SR; and the equality of the Take component of the slate number SA to the Take component of the slate number SR. If all equality checks executed at the step 1520 are determined to be true, meaning that the slate numbers are of the same scene, shot and take, then the method 1500 executes to progress to a step 1521. At the step 1521 the method 1500 determines the annotation notification type to be Type 3, and the process 1500 stops at the step 1521. If one or more of the equality checks executed at the step 1520 are not satisfied, then the method 1500 executes to progress from the step 1520 to a determination step 1530.

At the determination step 1530, the processor 1805 executes to check the equality of the Scene component of the slate number SA to the Scene component of the slate number SR; and the equality of the Shot component of the slate number SA to the Shot component of the slate number SR. If all equality checks executed at the step 1530 are true, meaning that the slate numbers are of the same scene and shot, the relevance value R is assigned value R1 and the method 1500 proceeds to a step 1531.

At the step 1531, the method 1500 determines content complexity value K1 from shot characteristics acquired only from shot metadata. The computation of the content complexity K1 is preferably determined according to the method 1000 described above with reference to FIG. 10.

After the step 1531 the process 1500 proceeds to a determination step 1532. At the step 1532 the relevance value R1 as determined at the step 1530 is compared with the content complexity value K1 as determined at the step 1531 to select the display characteristics of annotation notification. At the step 1532, if the complexity value K1 is greater than the relevance value R1 then the annotation notification is not presented to the user via the touch panel 1814 and the method 1500 proceeds to an exit step 1533. At the step 1532, if the complexity value K1 is less than or equal to the relevance value R1 then the annotation notification is determined to be of Type 1. The method 1500 stops at the step 1534.

If one or more of the equality checks executed at the step 1530 are not true, then the method 1500 executes to progress from the step 1530 to a determination step 1540.

At the determination step 1540, the process 1500 executes to checks the equality of the Scene component of the slate number SA to the Scene component of the slate number SR. If the equality check executed at the step 1540 is true, meaning that the slate numbers relate to the same scene, the relevance value R is assigned value R2 and the method 1500 proceeds to a step 1541.

At the step 1541 the method 1500 determines content complexity value K2 from shot characteristics acquired from video content metadata and from video content analysis. The computation of the content complexity K2 is preferably performed according to the method 1000 described above with reference to FIG. 10.

After the step 1541, the process 1500 proceeds to a determination step 1542. At the step 1542 the relevance value R2 as determined at the step 1540 is compared with the content complexity value K2 as determined at the step 1541 to select the display characteristics of annotation notification. At the step 1542, if the complexity value K2 is greater than the relevance value R2 then the annotation notification is not presented to the user and the method 1500 proceeds to an exit step 1543. At the step 1542, if the complexity value K2 is less than or equal to the relevance value R2 then the annotation notification is determined to be of Type 2. The method 1500 stops at the step 1544.

If the equality check executed at the step 1540 is not true, then the method 1500 executes to progress from the step 1540 to a step 1550. At the step 1550 the method 1550 determines not to present annotation notification. The methods 1500 stops at the step 1550.

In one implementation of the alternative implementation, the values R1, R2 used in the method 1500 are defined as in the following Table 4.

TABLE 4

| R | Relevance value example values |
|---|---|
| R1 | 80 |
| R2 | 40 |

Referring back to FIG. 8, once annotation notification display characteristics are determined at the step 850, the method 800 executes to the step 860 to present the annotation notification if necessary.

Examples/User Cases

Figure 16:
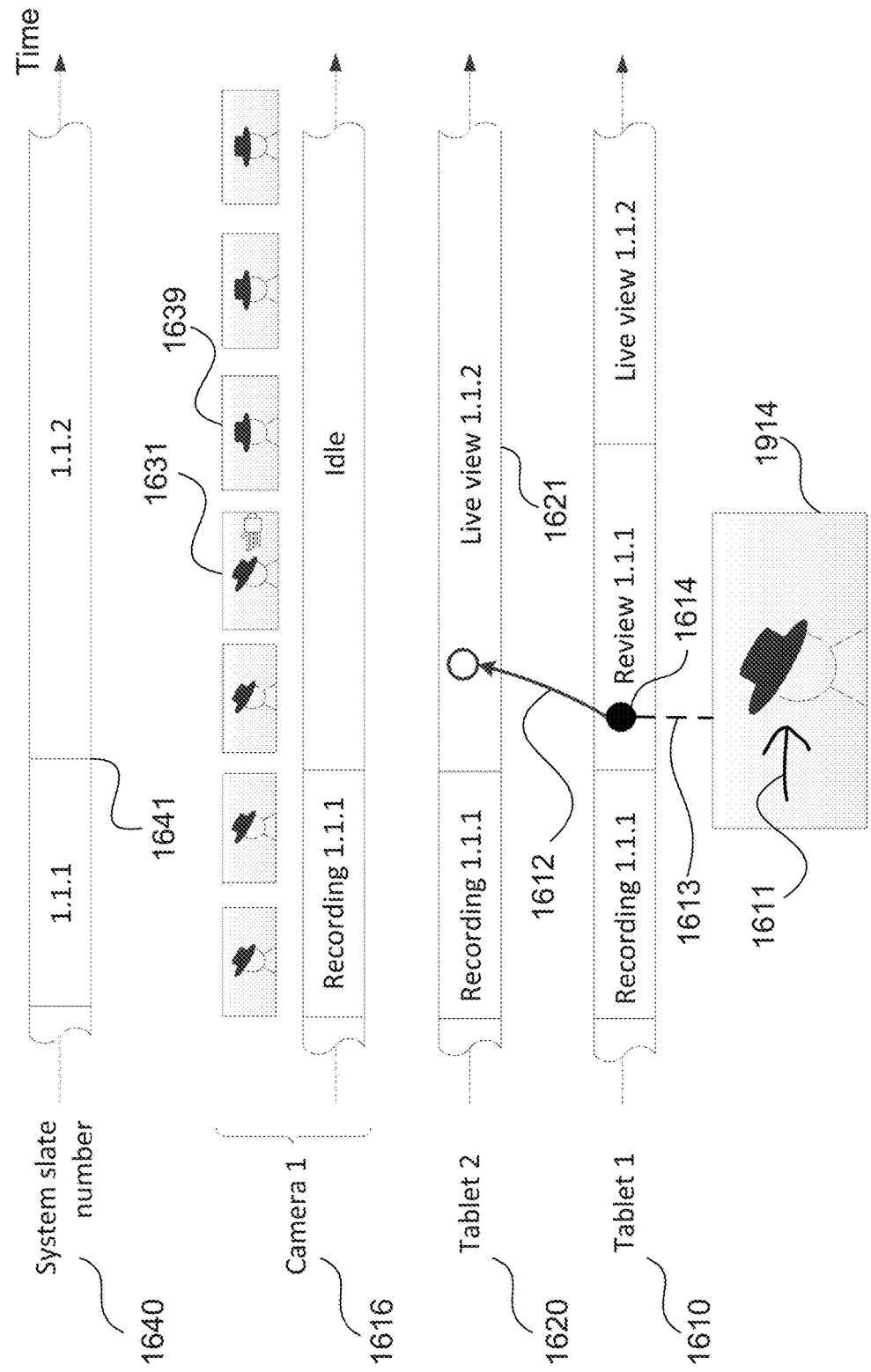
FIG. 16 is a depiction of an exemplary collaborative annotation process with low complexity.

A user case example of a collaborative annotation process on a video content with low complexity will now be provided with reference to FIG. 16. In a typical film production, it is often known in advance characteristics of a video content to be recorded. For example, an action that is planned to be recorded next may consist of an cast member standing still and talking into the camera, for example in a documentary film. In such case, the director, during the preparation phase, may enter shot characteristics for the next Take 1.1.1 as "Shot type" being "Close Up", "Shot Dynamism" being "Static" with value 0. The camera 250 starts and stops recording actor's performance according to a camera timeline 1630. After recording stops, the system slate number gets updated at time 1641 to next value 1.1.2. The director starts reviewing the take 1.1.1 on the first tablet device 210 according to timeline 1610, while the second tablet device 220 is displaying the live video content 1621 according to the timeline 1620 from the video camera timeline 1630. While reviewing the Take 1.1.1, the director notices that the hat on the actor's head is badly positioned, so the director decides to make an annotation 1611 on the screen 1814 of the first device 210 as seen in the timeline 1610, this being schematically indicated in FIG. 16 by the dashed line 1613. The annotation 1611, represented in the timeline 1610 as 1614 is then transmitted 1612 to the second device 1620. As the annotation 1611 is created for the Take 1.1.1 and the live view video content on the secondary tablet 220 has the slate number 1.1.2, the result is that the relevance value R becomes 80 as determined by execution of the method 900. By using the shot characteristics, the content complexity value K of the annotated video becomes 0 as determined through execution of the method 1000. At the step 830 the method 800 determines that the method 800 shall proceed to the steps 850 followed by the step 860. As the result, an annotation notification for the annotation 1611 is presented on the screen of the secondary device 220. The annotation notification may prompt the user of the second device 220 to take an action and to (physically) adjust 1631 the hat on the head of the cast member, which is re-positioned as seen at 1639.

Figure 17:
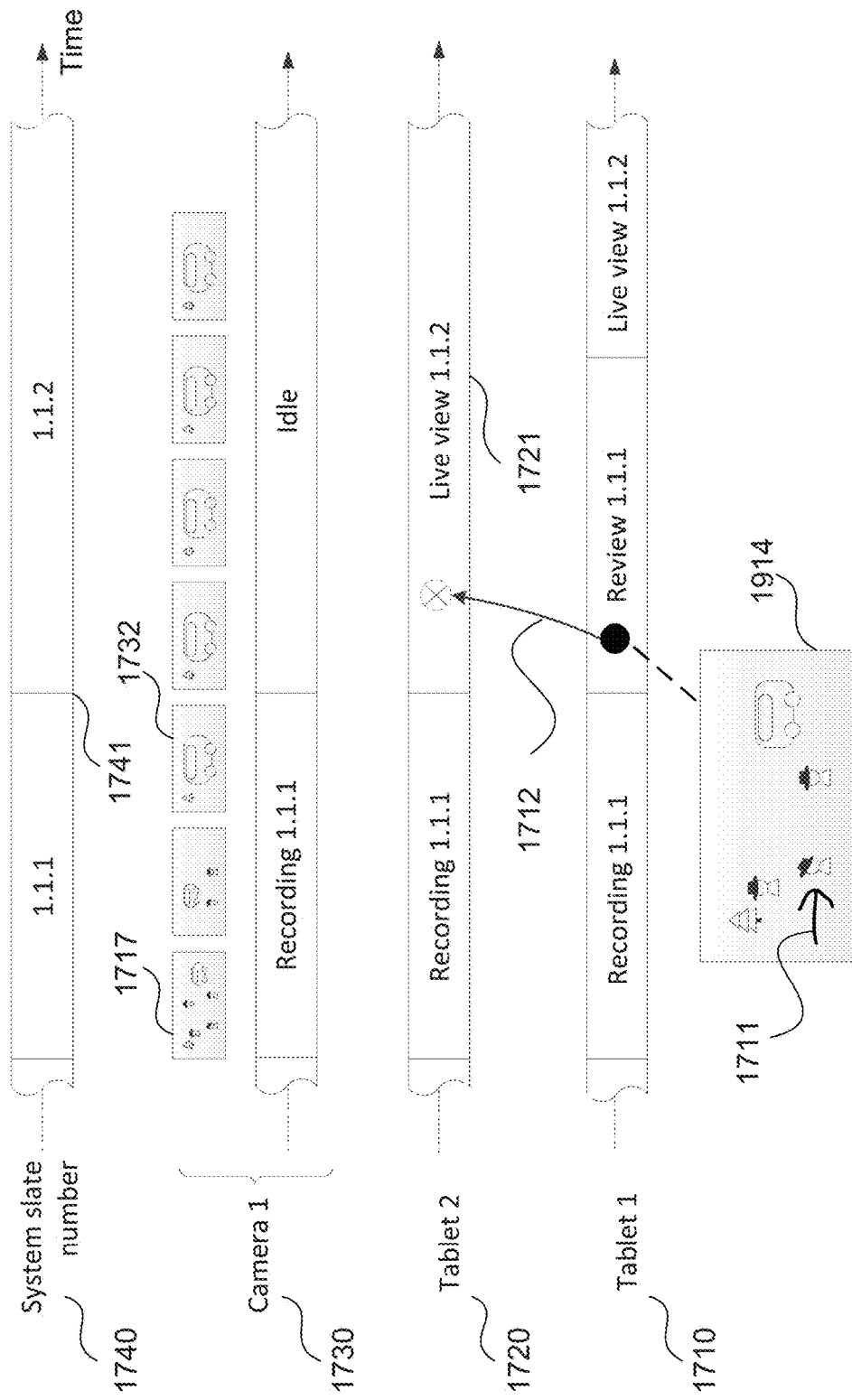
FIG. 17 is a depiction of an exemplary collaborative annotation process with high complexity.

Another user case example of a collaborative annotation process on a video content of high complexity will now be provided with reference to FIG. 17. In case where it is known that the next recording involves frequent camera pan and zoom actions, the director may enter shot characteristics for the next Take 1.1.1 as "Shot type" being "Wide angle", "Shot Dynamism" being "Movement" with value 90. For example, an action that is being recorded may start with a wide angle view of actors and landscape scenery 1731, and, as recording progresses, the camera operator pans and zooms the camera 250 on a motor vehicle that has arrived into the shot 1732. The recording stops at the image of the motor vehicle, as seen in the timeline 1730. After recording stops, the system slate number gets updated 1741 to the next value 1.1.2 as seen in the slate number timeline 1740. The director starts reviewing the take 1.1.1 on the first tablet device 210 as seen in the timeline 1710, while the second tablet device 220 having a timeline 1720 is displaying the live video content 1721 from the video camera 250 according to the timeline 1720. While reviewing the Take 1.1.1, the director notices that the hat on the actor's head is badly positioned, so the director decides to make an annotation 1711 on the screen 1814 of the first device 210 as noted in the timeline 1710. The annotation 1711 is then transmitted 1712 to the second tablet device 220 as seen in the timeline 1720. As the annotation 1711 is created for the Take 1.1.1 and the live view video content 1721 on the secondary tablet 220 has the slate number 1.1.2, the result is that the relevance value R becomes 80, as determined by the method 900. By using the shot characteristics, the content complexity value K of the annotated video becomes 90 as determined by the method 1000. At the step 830 the method 800 determines that the method 800 shall proceed to the exit steps 840, thus a notification annotation on the second tablet device 220 is not be presented. This is desirable because the complexity of the video content is high (e.g. significant panning and zooming) so the spatial relevance of the annotation is likely to be lost (i.e. annotation is made for the badly positioned hat, but the camera is currently capturing the motor vehicle), hence the annotation notification should not be displayed.

INDUSTRIAL APPLICABILITY

The arrangements described are applicable to the computer and data processing industries and particularly for the annotation of video content during the production process involving interaction between multiple persons and system components.

The foregoing describes only some embodiments of the present invention, and modifications and/or changes can be made thereto without departing from the scope and spirit of the invention, the embodiments being illustrative and not restrictive.

For example, whilst the arrangements described above include the determination of a complexity value associated with annotated shot for assisting in determining the annotation display characteristics, such may be optionally omitted. Where omitted, the relevance value determined from the video production hierarchy is used for selecting the display characteristic. In such an implementation, with reference to FIG. 7, steps 820 and 830 are omitted and step 840 depends from the determination of step 850. In such a case, the display characterises for the annotation derive from the hierarchy.

The invention claimed is:

1. A method for selecting a display characteristic for a video annotation notification on a destination display device interconnected across a communications network to at least one source device configured to generate a video annotation, the method comprising:
   receiving annotated video content from the at least one source device, wherein the annotated video content is associated with a source position identifier in a video production hierarchy;
   determining a destination position in the video production hierarchy for video content displayed on the destination display device;
   determining a difference between the determined destination position and the source position identifier associated with the annotated video content to define a relevance value threshold;
   determining a content complexity value from shot characteristics associated with the annotated video content, wherein the shot characteristics include at least one of the following: shot type and shot dynamism;
   selecting, for the destination display device, one or more display characteristics of the video annotation notification based on a complexity value being lower than the relevance value threshold; and
   displaying the video annotation notification at the destination display device according to a selected one of the one or more display characteristics.

2. The method according to claim 1, wherein at least one of the one or more display characteristics suppresses display of the video annotation notification on the destination display device.

3. The method according to claim 1,
   wherein, where the determined destination position and the source position identifier are the same, the relevance value threshold is a maximum value, and
   wherein, where the determined destination position and the source position identifier are not the same, the relevance value threshold is not the maximum value.

4. The method according to claim 3, wherein the video production hierarchy includes multiple hierarchal components and the relevance value threshold is determined based on a matching of the destination position and the source position identifier across the multiple hierarchical components.

5. The method according to claim 4, wherein the multiple hierarchical components include at least two of the following: scene, shot, and take.

6. The method according to claim 1, wherein determining the content complexity value includes determining the content complexity value from multiple sources associated with the annotated video content, wherein the multiple sources include at least one of the following: user input data and analysis of video content.

7. The method according to claim 6, wherein the analysis of video content includes at least one of the following: motion estimation and feature detection.

8. The method according to claim 1, wherein determining the relevance value threshold includes determining the relevance value threshold based on a distance between components in the video production hierarchy.

9. The method according to claim 1, wherein a selected at least one display characteristic includes one of the following: a dialog message box and highlighting of an annotation in an annotation list.

10. The method according to claim 1, wherein a selected at least one display characteristic includes displaying the video annotation at the destination display device.

11. The method according to claim 1, wherein the complexity value being lower than the relevance value threshold is $$C=1-K/R,$$

where C is a variable, K is the determined content complexity value, and R is the relevance value threshold.

12. The method according to claim 1, wherein the complexity value being lower than the relevance value threshold is that the relevance value threshold is compared with the determined content complexity value to select the one or more display characteristics of the video annotation notification.

13. A non-transitory computer readable storage medium having recorded thereon a program executable by a processor to perform a method for selecting a display characteristic for a video annotation notification on at least one destination display device interconnected across a communications network to at least one source device configured to generate a video annotation, the method comprising:
   receiving annotated video content from the at least one source device, wherein the annotated video content is associated with a source position identifier in a video production hierarchy;
   determining a destination position in the video production hierarchy for video content displayed on the at least one destination display device;
   determining a difference between the determined destination position and the source position identifier associated with the annotated video content to define a relevance value threshold;
   determining a content complexity value from shot characteristics associated with the annotated video content, wherein the shot characteristics include at least one of the following: shot type and shot dynamism;
   selecting, for the at least one destination display device, one or more display characteristics of the video annotation notification based on a complexity value being lower than the relevance value threshold; and
   displaying the video annotation notification at the destination display device according to a selected one of the one or more display characteristics.

14. An apparatus for selecting a display characteristic for a video annotation notification on at least one destination display device interconnected across a communications network to at least one source device configured to generate a video annotation, the apparatus comprising:
   a receiving unit configured to receive annotated video content from the at least one source device, wherein the annotated video content is associated with a source position identifier in a video production hierarchy;
   a destination position determining unit configured to determine a destination position in the video production hierarchy for video content displayed on the at least one destination display device;
   a difference determining unit configured to determine a difference between the determined destination position and the source position identifier associated with the annotated video content to define a relevance value threshold;
a content complexity value determining unit configured to determine a content complexity value from shot characteristics associated with the annotated video content, wherein the shot characteristics include at least one of the following: shot type and shot dynamism;
a selecting unit configured to select, for the at least one destination display device, one or more display characteristics of the video annotation notification based on a complexity value being lower than the relevance value threshold; and
a displaying unit configured to display the video annotation notification at the destination display device according to a selected one of the one or more display characteristics.

15. An electronic device comprising:
a processor coupled to a memory, wherein the memory stores a program executable by the processor to perform a method for selecting a display characteristic for a video annotation notification on at least one destination display device interconnected across a communications network to at least one source device configured to generate a video annotation, the method comprising:
receiving annotated video content from the at least one source device, wherein the annotated video content is associated with a source position identifier in a video production hierarchy,
determining a destination position in the video production hierarchy for video content displayed on the at least one destination display device,
determining a difference between the determined destination position and the source position identifier associated with the annotated video content to define a relevance value threshold,
determining a content complexity value from shot characteristics associated with the annotated video content, wherein the shot characteristics include at least one of the following: shot type and shot dynamism,
selecting, for the at least one destination display device, one or more display characteristics of the video annotation notification based on a complexity value being lower than the relevance value threshold, and
displaying the video annotation notification at the destination display device according to a selected one of the one or more display characteristics.

16. A method for selecting one or more display characteristics for a video annotation notification on at least one destination display device interconnected across a communications network to a source device configured to generate a video annotation, the method comprising:
annotating video content using the source device for communication to the at least one destination display device, wherein the annotated video content is associated with a source position identifier in a video production hierarchy;
determining a destination position in the video production hierarchy for video content displayed on the at least one destination display device;
determining a difference between the determined destination position and the source position identifier associated with the annotated video content to define a relevance value threshold;
determining a content complexity value from shot characteristics associated with the annotated video content, wherein the shot characteristics include at least one of the following: shot type and shot dynamism;
selecting, for the at least one destination display device, one or more display characteristics of the video annotation notification based on a complexity value being lower than the relevance value threshold; and
displaying the video annotation notification at the destination display device according to a selected one of the one or more display characteristics.

17. A method for selecting a display characteristic for a video annotation on a destination display device interconnected across a communications network to at least one source device configured to generate a video annotation, the method comprising:
receiving annotated video content from the at least one source device, wherein the annotated video content is associated with a source position identifier in a video production hierarchy;
determining a destination position in the video production hierarchy for video content displayed on the destination display device;
determining a difference between the determined destination position and the source position identifier associated with the annotated video content to define a relevance value threshold;
determining a content complexity value from shot characteristics associated with the annotated video content, wherein the shot characteristics include at least one of the following: shot type and shot dynamism;
selecting, for the destination display device, a display characteristic of the video annotation notification based on a complexity value being lower than the relevance value threshold; and
displaying the video annotation notification at the destination display device according to a selected one of the one or more display characteristics.

18. The method according to claim 17, wherein the selected display characteristic is one of:
(i) a display of the video annotation,
(ii) a display of the video annotation notification, and
(iii) a suppression of display of each of the video annotation and the video annotation notification.

* * * * *